(12) United States Patent
Pednault

(10) Patent No.: US 7,072,841 B1
(45) Date of Patent: Jul. 4, 2006

(54) METHOD FOR CONSTRUCTING SEGMENTATION-BASED PREDICTIVE MODELS FROM DATA THAT IS PARTICULARLY WELL-SUITED FOR INSURANCE RISK OR PROFITABILITY MODELING PURPOSES

(75) Inventor: Edwin Peter Dawson Pednault, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 580 days.

(21) Appl. No.: 09/302,154

(22) Filed: Apr. 29, 1999

(51) Int. Cl.
*G06F 17/60* (2006.01)

(52) U.S. Cl. .................... 705/4; 705/3; 705/1; 706/12

(58) Field of Classification Search .................... 705/4, 705/7, 10, 35, 21
See application file for complete search history.

(56) References Cited

U.S. PATENT DOCUMENTS

| | | | |
|---|---|---|---|
| 4,975,840 A * | 12/1990 | DeTore et al. ............... | 705/4 |
| 5,692,107 A * | 11/1997 | Simoudis et al. ............ | 705/3 |
| 5,712,984 A * | 1/1998 | Hammond et al. ........... | 705/1 |
| 5,970,464 A * | 10/1999 | Apte et al. .................. | 705/4 |
| 2001/0020229 A1* | 9/2001 | Lash ........................... | 706/12 |

FOREIGN PATENT DOCUMENTS

EP    1168198 A2 *  1/2002

OTHER PUBLICATIONS

Khanjanchi, A. Artificial Neural Networks: The next intelligence. 2003. USC Technology Commercialization Alliance. Retrieved from Internet. URL: http://web.archive.org/web/20031129222754/http://www.usc.edu/org/techalliance/Anthology2003/Final_Khajanch.pdf.*

* cited by examiner

*Primary Examiner*—Joseph Thomas
*Assistant Examiner*—Natalie A. Pass
(74) *Attorney, Agent, or Firm*—Stephen C. Kaufman, Esq.; McGinn IP Law Group, PLLC

(57) ABSTRACT

The invention considers a widely applicable method of constructing segmentation-based predictive models from data that permits constraints to be placed on the statistical estimation errors that can be tolerated with respect to various aspects of the models that are constructed. The present invention uses these statistical constraints in a closed-loop fashion to guide the construction of potential segments so as to produce segments that satisfy the statistical constraints whenever it is feasible to do so. The method is closed-loop in a sense that the statistical constraints are used in a manner that is analogous to an error signal in a feed-back control system, wherein the error signal is used to regulate the inputs to the process that is being controlled.

20 Claims, 5 Drawing Sheets

METHOD FOR CONSTRUCTING SEGMENTATION-BASED PREDICTIVE MODELS FROM DATA THAT IS PARTICULARLY WELL-SUITED FOR INSURANCE RISK OR PROFITABILITY MODELING PURPOSES

FIELD OF THE INVENTION

This invention relates to a method for constructing predictive models from data that is particularly well-suited for modeling insurance risks or policyholder profitability, based on historical policy and claims data.

BACKGROUND OF THE INVENTION

Our work considers a widely applicable method of constructing segmentation-based predictive models from data that permits limits to be placed on the statistical estimation errors that can be tolerated with respect to various aspects of the models that are constructed. In this regard, we have discerned that the ability to limit estimation errors during model construction can be quite valuable in industries that use predictive models to help make financial decisions. In particular, we have discerned that this ability is of critical importance to the insurance industry.

Insurers develop price structures for insurance policies based on actuarial risk models. These models predict the expected claims that will be filed by policyholders as a function of the policyholders' assessed levels of risk. A traditional method used by actuaries to construct risk models involves first segmenting an overall population of policyholders into a collection of risk groups based on a set of factors, such as age, gender, driving distance to place of employment, etc. The risk parameters of each group (i.e., segment) are then estimated from historical policy and claims data.

Ideally, the resulting risk groups should be homogeneous with respect to risk; that is, further subdividing the risk groups by introducing additional factors should yield substantially the same risk parameters. In addition, the risk groups should be actuarially credible; that is, the statistical errors in the estimates of the risk parameters of each group should be sufficiently small so that fair and accurate premiums can be charged to the members of each risk group.

However, identifying homogeneous risk groups that are also actuarially credible is not a simple matter. Actuaries typically employ a combination of intuition, guesswork, and trial-and-error hypothesis testing to identify suitable risk factors. For each combination of risk factors that are explored, actuaries must estimate both the risk parameters of the resulting risk groups as well as the actuarial credibility of those parameter estimates. The human effort involved is often quite high and good risk models can take several years to develop and refine.

SUMMARY OF THE INVENTION

Our method overcomes the limitations inherent in manual methods for constructing segmentation-based predictive models by combining automated search over possible segmentations with constraints on the statistical estimation errors that can be tolerated in the predictive models that are constructed for each segment. In the case of insurance risk modeling, the segments would correspond to risk groups and the constraints would correspond to criteria used by actuaries to assess actuarial credibility.

The benefit of our method, from the point of view of insurance risk modeling, is that automation enables potential risk factors to be analyzed in greater detail. Consequently, our method can be far more effective at identifying relevant risk factors than traditional methods employed by actuaries, to the point where new risk factors are identified that were previously unrecognized. Moreover, assessments of actuarial credibility are made throughout the process in order to ensure the credibility of the resulting risk groups. By constraining the automated search to only produce actuarially credible risk groups, our method enables highly predictive risk models to be developed in a matter of weeks or days.

In addition to its use in constructing risk models, our methodology can also be used to construct profitability models. Whereas risk models segment policyholders into homogeneous groups according to their levels of risk, profitability models segment policyholders into homogeneous groups according to their loss ratios (i.e., the ratio of claims paid over premiums collected). Differences in profitability among the segments that are identified would enable actuaries to diagnose ailing insurance products to determine why they are unprofitable. Moreover the risk factors that define each segment, combined with the profitability predictions of each segment, would provide concrete indications of how to adjust a product's existing price structure to make it profitable.

To this end, we have discerned that deficiencies exist in the prior art on segmentation-based modeling methods with regard to the kinds of constraints that can be placed on the statistical estimation errors that can be tolerated with respect to various aspects of the models that are constructed for each segment. These deficiencies are especially evident in the context of insurance risk modeling.

For example, Gallagher (C. Gallagher, "Risk classification aided by new software tool," *National Underwriter Property & Casualty-Risk & Benefits Management*, No. 17, p. 19, Apr. 27, 1992) discusses how the CHAID classification tree algorithm (G. V. Kass, "An exploratory technique for investigating large quantities of categorical data," *Applied Statistics*, Vol. 29, No. 2, pp. 119–127, 1980; and D. Biggs, B. de Ville, and E. Suen, "A method of choosing multiway partitions for classification and decision trees," *Journal of Applied Statistics*, Vol. 18, No. 1, pp. 49–62, 1991) can be used to segment populations of automobile insurance policyholders into high-risk and low-risk groups based on accident frequency. Gallagher's methodology is not restricted to CHAID and can also be applied in conjunction with other tree-based modeling packages, such as CART (L. Breiman, J. H. Friedman, R. A. Olshen, and C. J. Stone, *Classification and Regression Trees*, New York: Chapman & Hall, 1984), C4.5 (J. R. Quinlan, C4.5: *Programs for Machine Learning*, San Mateo, Calif.: Morgan Kaufmann, 1993), SPRINT (J. C. Shafer, R. Agrawal, and M. Mehta, "SPRINT: a scalable parallel classifier for data mining," *Proceedings of the 22nd International Conference on Very Large Databases*, Bombay, India, September 1996), and QUEST (W.-Y. Loh and Y.-S. Shih, "Split selection methods for classification trees," *Statistica Sinica*, Vol. 7, pp. 815–840, 1997). A deficiency common to all of the above tree-based methods, however, is that the methods are not designed to take actuarial credibility into consideration; consequently, the risk groups that are identified by these tools are not guaranteed to be actuarially credible.

As previously discussed, actuarial credibility has to do with the statistical accuracy of estimated risk parameters. Actuaries not only want risk models that have high predictive accuracy in terms of distinguishing high risks from low risks, they also want accurate statistical estimates of the risk parameters so that price structures can be derived from the risk models that are both fair and accurate. The calculations needed to assess actuarial credibility are specific to the statistical models used by actuaries to model insurance risk (see, for example, S. A. Klugman, H. H. Panjer, and G. E. Willmot, *Loss Models: From Data to Decisions*, New York: John Wiley & Sons, 1998). Tree-based methods in the prior art are simply not equipped to perform these calculations because they are not specifically designed for insurance risk modeling purposes.

The above deficiency can be demonstrated by using property and casualty insurance as an example. For this type of insurance, a proposed risk group is said to be fully credible if the number of historical claims filed by that group as calculated from the training data is greater than or equal to a threshold whose value is determined from the average claim amount for the group, as calculated from the training data, and from the standard deviation of those claims amounts, also as calculated from the training data. In short, the minimum number of claims needed to achieve full credibility is a function of the statistical characteristics of those claims. Because these statistical characteristics can vary from one proposed risk group to another, the minimum number of claims needed to achieve full credibility can likewise vary from one proposed risk group to another.

Prior art tree-based methods are able to impose constraints on the minimum number of records in the training data per segment (i.e., per leaf node); however, these constraints are global in nature in that the thresholds are constant across all segments. For example, global thresholds can be placed either on the minimum number of training records per segment (see, for example, the stopping rules discussed in the SPSS white paper entitled "AnswerTree algorithm summary," available from SPSS, Inc. at http://www.spss.com/cool/papers/algo_sum.htm), or on the minimum number of training records per segment for each species of data record (e.g., claim versus nonclaim records). Examples of the latter include the stopping rules described by Loh and Vanichsetakul (W.-Y. Loh and N. Vanichsetakul, "Tree-structured classification via generalized discriminant analysis," *Journal of the American Statistical Association*, Vol. 83, pp. 715–728, 1988) and the "fraction of objects" rule implemented in the STATISTICA package available from StatSoft, Inc. (see, for example, the StatSoft documentation available at http://www.statsoft.com/textbook/stcla-tre.html). Again, in both cases, the thresholds are constant across all segments constructed by the tree-based methods, whereas constraints on actuarial credibility entail thresholds that vary from one segment to another as a function of the statistical characteristics of each segment.

In sharp contrast, our segmentation-based modeling method is able to utilize complex constraints, such as actuarial credibility, as an integral part of the model building process so as to produce segmentations that satisfy the constraints. In particular, when applied to insurance risk modeling, our method ensures that the resulting risk groups will meet desired actuarial credibility constraints.

A further deficiency of prior art method is that, even if the ability to apply complex statistical constraints were incorporated into prior art methods, such as CHAID (see Kass above, and Biggs et al. above), CART (see Breiman et al. above), C4.5 (see Quinlan, 1993, above), SPRINT (see Shafer et al. above), and QUEST (see W.-Y. Loh and Y.-S. Shih above), the methods would apply the statistical constraints in an open-loop fashion, in the sense that potential segments would first be constructed and the statistical constraints would then be applied to decide when to stop refining the segments. With this open-loop approach, poor choices made during the construction of potential segments can cause premature termination of the segment refinement process by producing potential segments that violate the statistical constraints, despite the fact that it may have been possible to produce alternate segments that satisfy the constraints.

In sharp contrast, the present invention uses statistical constraints in a closed-loop fashion to guide the construction of potential segments so as to produce segments that satisfy the statistical constraints whenever it is feasible to do so. The method is closed-loop in the sense that the statistical constraints are used in a manner that is analogous to an error signal in a feedback control system, wherein the error signal is used to regulate the inputs to the process that is being controlled (see, for example, J. J. Distefano, A. R. Stubberud, and I. J. Williams, *Schaum's Outline of Theory and Problems of Feedback and Control Systems*, New York: McGraw-Hill, 1967). In the case of the present invention, the statistical constraints are repeatedly evaluated to determine whether or not they hold, and the results of the evaluations are used to regulate the construction of potential segments. This closed-loop methodology ensures that potential segments are constructed that satisfy the statistical constraints whenever it is feasible to do so. The methodology thereby avoids premature termination of the segment refinement process caused by poor choices made during the construction of potential segments.

In addition to deficiencies with respect to the kinds of statistical constraints that can be imposed on segments, we have also discerned that several other deficiencies exist in the prior art on segmentation-based modeling methods from the point of view of insurance risk modeling. As described above, Gallagher's methodology for identifying risk groups is based on constructing segmentation-based models for predicting claim frequency. However, frequency is only one of the risk parameters relevant to automobile insurance. Other risk parameters include severity (i.e., mean claim amount), pure premium (i.e., frequency times severity), and loss ratio (i.e., pure premium over premium charged). Segmenting policyholders into risk groups based on frequency alone, as described by Gallagher, and then estimating other risk characteristics after the fact may yield suboptimal risk models because the resulting risk groups might not be optimized for predicting the specific risk parameter(s) of interest.

Pure premium is perhaps the most important risk characteristic because it represents the minimum amount that policyholders in a risk group must be charged in order to cover the claims generated by that risk group. Actual premiums charged are ultimately determined based on the pure premiums of each risk group, as well as on the cost structure of the insurance company, its marketing strategy, competitive factors, etc.

If the objective is to predict pure premium, then Gallagher's suggestion of segmenting policyholders into risk groups based on frequency may be suboptimal because the resulting risk groups might not be optimized for predicting pure premium. This deficiency exists not only with respect to CHAID, but with respect to all other tree-based modeling packages as well, such as CART (see L. Breiman et al. above), C4.5 (see J. R. Quinlan, 1993, above), SPRINT (see J. C. Shafer et al. above), and QUEST (see W.-Y. Loh and Y.-S. Shih above).

It is possible to directly model pure premium using some tree-based modeling packages; however, the resulting models can again be suboptimal because the statistical characteristics of insurance data are not being taken into account.

To directly model pure premium using standard tree-based techniques, one can make use of the fact well-known to actuaries that the pure premium of a risk group can be computed as a weighted average of the pure premiums of the individual historical policy and claims data records that belong to the risk group. The pure premium of an individual data record is equal to the claim amount associated with that data record divided by the record's earned exposure (i.e., the length of time represented by that data record during which the corresponding policy was actually in force). The weighted average is calculated by summing the products of each individual pure premium times its corresponding earned exposure, and then dividing the resulting sum by the sum of the earned exposures.

Loss ratio (i.e., the ratio of claims paid over premiums collected) can also be modeled directly in terms of weighted sums of individual loss ratios. The loss ratio of an individual data records is equal to the record's claim amount divided by its earned premium (i.e., the premium charged per unit time for the policy times the record's earned exposure). As is well-known to actuaries, the loss ratio of a risk group can be calculated by summing the products of each individual loss ratio times its corresponding earned premium, and then dividing the resulting sum by the sum of the earned premiums.

Several tree-based modeling packages do allow weights to be assigned to data records and are thereby able to calculate the weighted averages needed to directly model pure premium or loss ratio. An example of such a package is SPSS's implementations of CHAID and CART (see, for example, http://www.SPSS.com). However, these packages segment data records based on weighted sums of squares calculations. In particular, in the case of pure premium, risk groups would be identified using numerical criteria that rely on calculating sums of weighted squared differences between individual pure premiums and weighted averages of individual pure premiums. In the case of loss ratio, the numerical criteria would rely on calculating sums of weighted squared differences between individual loss ratios and weighted averages of individual loss ratios.

One of the lessons taught by work in robust estimation (see, for example, R. R. Wilcox, *Introduction to Robust Estimation and Hypothesis Testing*, New York: Academic Press, 1997) is that such squared difference criteria can yield suboptimal estimation procedures for data that have highly skewed distributions. In the case of automobile claims data, both the pure premiums and the loss ratios of individual claim records do in fact have highly skewed distributions. The squared difference criteria used by standard tree-based modeling packages are therefore not well-suited for these data. Segmenting policyholders on the basis of these criteria may therefore yield suboptimal results relative to the results that could be obtained if more robust criteria were employed based on the actual statistical characteristics of the data.

Actuaries have long recognized that claim-related data tend to have highly skewed distributions. An important principle of actuarial science is to employ statistical distributions whose shapes closely match the observed distributions of the data (see, for example, S. A. Klugman et al. above). For example, in the case of personal lines automobile insurance, claim events are often modeled as Poisson random processes and claim amounts are often modeled using log-normal probability distributions. The importance of employing statistical distributions that match observed distributions of data is likewise demonstrated by work in robust estimation.

Another important distinguishing feature of the present invention is that the invention enables any of the statistical models employed by actuaries to be used as the basis for automatically identifying risk groups, thereby overcoming the deficiencies of prior art techniques that are described above. In particular, joint Poisson/log-normal models can be used to construct risk models for personal lines automobile insurance. This same class of models is also suitable for personal lines property and casualty insurance in general.

A second additional aspect in which prior art tree-based methods are deficient is that the methods do not take into account the fact that some claims can take several years to settle, most notable bodily injury claims. Specialized estimation procedures are generally required to estimate risk parameters in the presence of unsettled claims. As with actuarial credibility, the calculations that are needed are specific to the statistical models used by actuaries to model insurance risk. Once again, standard tree-based methods are not equipped to perform these calculations because they are not specifically designed for insurance risk modeling purposes. Our method, on the other hand, is able to incorporate such estimation procedures.

As indicated above, we have discerned that the prior art methods for automatically constructing segmentation-based models have numerous deficiencies that are especially evident from the point of view of insurance risk modeling. In sharp contrast, we have now discovered a methodology for constructing segmentation-based models that overcomes these deficiencies.

In a first aspect, the present invention discloses a program storage device readable by a machine, tangibly embodying a program of instructions executable by the machine to perform method steps for constructing segmentation-based models that satisfy constraints on the statistical properties of the segments, the method steps comprising:

(1) presenting a collection of training data records comprising examples of input values that are available to the model together with the corresponding desired output value(s) that the model is intended to predict; and (2) generating on the basis of the training data a plurality of segment models, that together comprise an overall model, wherein each segment model is associated with a specific segment of the training data, the step of generating comprising performing optimization steps comprising:

a) generating alternate training data segments and associated segment models;

b) evaluating at least one generated segment to determine whether it satisfies at least one statistical constraint comprising a test whose outcome is not equivalent to a comparison between, on the one hand, the number of training records of at least one species of training records belonging to the segment and, on the other hand, a numerical quantity that may depend on the combination of species of training records being considered but that is otherwise constant for all generated segments that are evaluated; and c) selecting a final plurality of segment models and associated segments from among the alternates evaluated that have satisfactory evaluations.

This first aspect of the invention can realize significant advantages because it enables complex constraints to be placed on the statistical estimation errors that can be tolerated with respect to various aspects of the predictive models that are constructed. For example, in the context of insurance risk modeling, the invention can be used to impose actuarial credibility constraints on the risk groups that are constructed.

In a second aspect, the present invention discloses a program storage device readable by a machine, tangibly embodying a program of instructions executable by the machine to perform method steps for constructing segmentation-based models that satisfy constraints on the statistical properties of the segments, the method steps comprising:

(1) presenting a collection of training data records comprising examples of input values that are available to the model together with the corresponding desired output value(s) that the model is intended to predict; and (2) generating on the basis of the training data a plurality of segment models, that together comprise an overall model, wherein each segment model is associated with a specific segment of the training data, the step of generating comprising performing optimization steps comprising:
a) generating alternate training data segments and associated segment models using statistical constraints to guide the construction of the data segments in a closed-loop fashion so as to ensure that the resulting data segments satisfy the statistical constraints; and
b) selecting a final plurality of segment models and associated segments from among the alternates generated.

In a third aspect, the present invention discloses a program storage device readable by a machine, tangibly embodying a program of instructions executable by the machine to perform method steps for constructing segmentation-based models that satisfy constraints on the statistical properties of the segments, the method steps comprising:

(1) presenting a collection of training data records comprising examples of input values that are available to the model together with the corresponding desired output value(s) that the model is intended to predict;

(2) generating on the basis of the training data a plurality of segment models, that together comprise an overall model, wherein each segment model is associated with a specific segment of the training data, the step of generating comprising:
a) generating alternate pluralities of data segments and associated segment models; and
b) adjusting the alternate pluralities so that the resulting data segments satisfy the statistical constraints.

These second and third aspects of the invention can realize significant advantages because they enable constraints to be placed on the statistical estimation errors that can be tolerated with respect to various aspects of the predictive models that are constructed, while at the same time preventing premature termination of the segment refinement process caused by poor choices made during the construction of the segments.

In a fourth aspect, the present invention discloses a program storage device readable by a machine, tangibly embodying a program of instructions executable by the machine to perform method steps for constructing segmentation-based models of insurance risks, the method steps comprising:

(1) presenting a collection of training data comprising examples of historical policy and claims data; and (2) generating on the basis of the training data a plurality of segment models, that together comprise an overall model, wherein each segment model is associated with a specific segment of the training data, the step of generating comprising performing optimization steps comprising:
a) generating alternate training data segments and associated segment models;
b) evaluating the generated segment models using numerical criteria derived from statistical models used by actuaries to model insurance risks, and
c) selecting a final plurality of segment models and associated segments from among the alternates generated so as to optimize aggregate numerical criteria for the plurality.

This fourth aspect of the invention can realize significant advantages because the invention can be applied in conjunction with any of the various statistical models employed by actuaries in order to construct highly predictive risk models that take into account the statistical properties of insurance data associated with specific insurance products.

For example, the invention can be used in conjunction with a joint Poisson/log-normal statistical model in order to construct risk models for personal lines automobile insurance in particular, and personal lines property and casualty insurance in general.

The invention can also be advantageously used to model the profitability of insurance products by replacing the parameters that appear in the statistical models with parametric functions of the premiums charged to policyholders. In the case of a joint Poisson/log-normal model, the frequency and severity parameters can be replaced with functions of the premiums charged. In such illustrative expressions, the novel method can model the relationships between actual insurance risk and an insurer's existing price structure. In so doing, it can identify factors that distinguish the most profitable policyholders from the least profitable ones.

BRIEF DESCRIPTION OF THE DRAWINGS

The invention is illustrated in the accompanying drawing, in which.

DETAILED DESCRIPTION OF THE INVENTION

Figure 1:
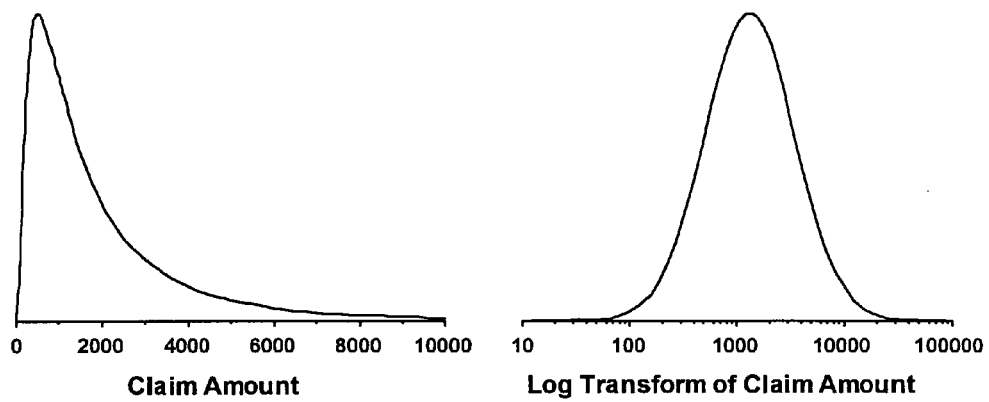
FIG. 1 provides examples of theoretical histograms defined by the log-normal distribution for claim amounts and the logarithms of claim amounts.

As summarized above, the present invention enables segmentation-based models to be constructed wherein the model building process is constrained to only produce segments with desirable statistical characteristics. In particular, for insurance risk modeling purposes, the segments can be constrained to be actuarially credible. A second benefit of the invention is that it can be applied in conjunction with any of the various statistical models employed by actuaries in order to construct highly predictive risk models that take into account the statistical properties of insurance data associated with specific insurance products.

It is important to point out that the invention is widely applicable and its use is in no way restricted to insurance risk modeling. Insurance risk modeling is merely an illustrative example that clearly demonstrates the utility of incorporating statistical constraints into the model building process. Insurance risk modeling will thus be used as the running example to motivate the technical aspects of the invention.

Actuarial science is based on the construction and analysis of statistical models that describe the process by which claims are filed by policyholders (see, for example, Klugman et al. above). Different types of insurance often require the use of different statistical models. For any type of insurance, the choice of statistical model is often dictated by the fundamental nature of the claims process. For example, for property and casualty insurance, the claims process consists of claims being filed by policyholders at varying points in time and for varying amounts. In the normal course of events, wherein claims are not the result of natural disasters or other widespread catastrophes, loss events that result in claims (i.e., accidents, fire, theft, etc.) tend to be randomly distributed in time with no significant pattern to the occurrence of those events from the point of view of insurable risk. Policyholders can also file multiple claims for the same type of loss over the life of a policy. Claim filings such as these can be modeled as a Poisson random process (see, for example, Klugman et al. above), which is the appropriate mathematical model for events that are randomly distributed over time with the ability for events to reoccur (i.e., renew).

The Poisson model is used as an illustrative example in the illustrative embodiment of the invention that is presented below. However, in the case of insurance risk modeling, the invention can also be practiced using other statistical models of claim events depending on the characteristics of the particular insurance product being considered. The invention can likewise be practiced in the general context of predictive modeling in combination with virtually any kind of statistical model.

Although the Poisson model is generally quite suitable for property and casualty insurance, it should be noted that Poisson processes are not appropriate for modeling catastrophic claims arising from widespread disasters, such as hurricanes, earthquakes, floods, etc., because such catastrophes do not produce uniform distributions of loss events over time. Instead, natural disasters lead to clusters of claims being filed over short periods of time, where the number of claims in each cluster depends both on the number of policyholders in the region affected by the disaster and on the severity of the disaster. An appropriate statistical model would likewise take into account the geographic distribution of policyholders relative to the damage caused by disasters.

The Poisson model is also not appropriate for modeling other forms of insurance, such as life insurance in which at most one death benefit is ever claimed per policy. Life insurance is best modeled as a survival process, not a renewal process.

Again, it is important to point out that the invention can be practiced using other statistical models. The Poisson model is not a requirement, it is merely a convenient example.

In addition to modeling the distribution of claims over time, actuaries must also model the amounts of those claims. In actuarial science, claim amounts for property and casualty insurance are modeled as probability distributions. Two kinds of distributions are usually considered: those for the amounts of individual claims, and those for the aggregate amounts of groups of claims. In principle, aggregate loss distributions can be derived mathematically from the distributions of the individual losses that make up the sum. However, only in a few special cases can closed-form solutions be obtained for these mathematical equations. In most cases, approximations must be employed. Fortunately, actuaries typically consider large groups of claims when analyzing aggregate loss. The central limit theorem can therefore be invoked and aggregate losses can be reasonably approximated by normal (i.e., Gaussian) distributions.

In one examination we made of historical automobile claims data, claim amounts were found to have a highly skewed distribution. Most claims were small in value relative to the maximum amounts covered by the policies, but a significant proportion of large claims were also present. When the claim amounts were logarithmically transformed, the skewness virtually disappeared and the resulting distribution was found to be highly Gaussian in shape. These properties are the defining characteristics of log-normal distributions, an example of which is illustrated in FIG. 1.

The log-normal distribution is used as an illustrative example in the illustrative embodiment of the invention that is presented below. However, as with Poisson models, the invention can also be practiced using other statistical distributions of claim amounts depending on the characteristics of the particular insurance product being considered. In particular any of the statistical distributions employed by actuaries (see, for example, Klugman et al. above) can be used. The invention can likewise be practiced in the general context of predictive modeling in combination with virtually any kind of statistical model.

Unfortunately, there are no closed-form solutions for the aggregate loss distribution given that individual losses follow a log-normal distribution. In particular, a sum of log-normal random variables is not itself log-normal. An approximation must therefore be made. In one embodiment of the invention that is presented below, the central limit theorem is invoked and the normal distribution is used to model aggregate losses. However, aggregate loss distributions are not used to identify risk groups, they are only used after the fact to estimate the aggregate parameters of each risk group. Risk groups are identified using numerical criteria that evaluate the predictive accuracy of the resulting risk model on individual losses. The above approximation for aggregate losses therefore has no effect on the risk groups that are identified.

It should be noted, however, that the invention could alternatively be practiced using numerical criteria analogous to those employ in CHAID (see Kass above, and Biggs et al. above) that would evaluate the statistical significance of observed differences in aggregate risk characteristics between alternative risk groups. For such criteria, the method of approximation would take on greater importance.

Because different distributions are used to model individual versus aggregate losses, different statistical procedures are employed for estimating the parameters of these distributions. For the log-normal distributions used to model individual losses, the relevant statistical parameters are the means and standard deviations of the natural logarithms of the individual claim amounts. For the normal distributions used to model aggregate losses, the means and standard deviations of the (raw) claim amounts are the parameters that need to be estimated.

As previously discussed, a traditional method used by actuaries to construct risk models involves segmenting the overall population of policyholders into a collection of risk groups based on a set of factors, such as age, gender, driving distance to place of employment, etc. Actuaries typically employ a combination of intuition, guesswork, and trial-and-error hypothesis testing to identify suitable factors. The human effort involved is often quite high and good risk models can take several years to develop and refine.

The invention replaces manual exploration of potential risk factors with automated search. When the invention is applied to insurance risk modeling, risk groups are preferably identified in a top-down fashion by a method that is similar in spirit to those employed in prior art algorithms such as CHAID (see Kass above, and Biggs et al. above), CART (see Breiman et al. above), C4.5 (see Quinlan, 1993, above), SPRINT (see Shafer et al. above), and QUEST (see W.-Y. Loh and Y.-S. Shih above). Starting with an overall population of policyholders, policyholders are first divided into at least two risk groups by identifying the risk factor that yields the greatest increase in predictive accuracy given the risk groups that are produced, subject to the constraint that the resulting risk groups must be actuarially credible. Each resulting risk group is then further subdivided by identifying additional factors in the same manner as before. The process is continued until the resulting risk groups are declared either to be homogeneous (i.e., further subdivisions do not increase predictive accuracy) or too small to be further subdivided from the point of view of actuarial credibility.

In the general context of predictive modeling, risk groups correspond to population segments and actuarial credibility corresponds to a statistical constraint on the population segments. An important difference between the invention and prior art methods is that the method of identifying splitting factors for dividing larger population segments into smaller population segments is preferably constrained so that the resulting segments satisfy desired statistical constraints, where the constraints can be arbitrarily complex. In particular, the constraints are not restricted to the prior art technique of imposing global thresholds on the number of training records of various types that belong to each segment. In the case of risk modeling for property and casualty insurance, actuarial credibility constraints do correspond to thresholds on the number of claim records that belong to each segment (i.e., risk group); however, the thresholds are not global constants, but instead are functions of the statistical properties of the claim amounts for each segment. The thresholds can thus vary from one segment to another.

Another important difference between the invention and prior art methods is that, for the purpose of insurance risk modeling, splitting factors are preferably selected based on numerical optimization criteria derived from statistical models of insurance risk. For example, in the case of the illustrative embodiment of the invention presented below, a joint Poisson/log-normal model is used in order to simultaneously model frequency and severity, and thereby pure premium. Splitting factors are selected in this example by minimizing a negative log-likelihood criterion derived from the joint Poisson/log-normal model. Minimizing this criterion maximizes the likelihood of the data given the joint Poisson/log-normal model, and it thereby maximizes the predictive accuracy of the resulting risk model. Tailoring the choice of statistical model to the specific characteristics of the insurance product being considered can yield more accurate risk models than could be obtained using, for example, a conventional least-squares (i.e., Gaussian) model.

If the invention were practiced using other statistical models, the same methodology for identifying risk factors would preferably be employed, except that the optimization criteria would preferably change according to the statistical models that are used. For example, in the case of profitability modeling, the statistical models could quantify insurance risk as a function of the premium charged. The optimization criteria derived from the resulting statistical models would then cause risk factors to be identified that yield the greatest increase in predictive accuracy with respect to estimated loss ratio instead of estimated risk. Suitable optimization criteria for other forms of insurance could likewise be derived from statistical models appropriate for those products.

Any prior art method for identifying splitting factors can be modified to meet the requirements of the invention by suitably constraining the methods to always produce splits that satisfy the desired statistical constraints on the resulting segments. In addition, for the purpose of insurance risk modeling, the numerical criteria employed by those methods would preferably be replaced with numerical criteria derived from statistical models of insurance risk. For example, the methods employed in CHAID (see Kass above, and Biggs et al. above), CART (see Breiman et al. above), C4.5 (see Quinlan, 1993, above), SPRINT (see Shafer et al. above), and QUEST (see W.-Y. Loh and Y.-S. Shih above) can all be modified for use with the invention.

Of these, we prefer a modified version of the bottom-up merging technique used in CHAID. This preferred, modified version always attempts to produce two-way splits in the case of non-missing values, and it avoids producing segments that fail to satisfy the desired statistical constraints. The preferred method for dividing a larger segment into two or more smaller segments proceeds as follows:

1) For each explanatory data field (i.e., data fields whose values are allowed to be used to distinguish one population segment from another), divide the larger segment into smaller, mutually-exclusive segments based on the possible values of that explanatory data field in the same manner as done in CHAID.

Thus, in the case of a categorical data field, each of the smaller segments corresponds to one of the category values admitted under the definition of the larger segment. If the data field is not mentioned in the definition of the larger segment, then a smaller segment is constructed for each possible category value for that field. If the definition of the larger segment restricts the value of the data field to a subset of category values, then smaller segments are constructed only for category values in that subset. In both cases, it is possible that some category values correspond to missing values for the data field.

In the case of a numerical data field, the possible values of the data field are discretized into ordinal classes as described by Biggs et al. (see Biggs et al. above) and segments are constructed for each of these ordinal classes. Segments must also be constructed for additional "floating" categories (see Kass above) that correspond to missing values for the data field.

2) For each explanatory data field, set aside those segments constructed in step 1 that admit missing values for the explanatory field and perform the following merge steps on the remaining segments for the explanatory field:
   a) For nominal explanatory fields, merge together all remaining segments for which the record count for at least one species of training records belonging to the segment lies below a given threshold for that species.
   b) For ordinal explanatory fields, if all remaining segments have at least one training record species count that lies below the corresponding threshold referred to in step 2a, then merge all remaining segments together. Otherwise, repeatedly select and merge pairs of remaining segments that satisfy the following conditions until the conditions can no longer be satisfied or until a single segment is obtained:
      i) The values of the explanatory field that are admitted by the two segments to be merged are adjacent with respect to the ordering of the values for that ordinal explanatory field.
      ii) At least one training record species count for one of the segments to be merged lies below the corresponding threshold referred to in step 2a, while all training record species counts for the other segment in the pair lie above the corresponding thresholds.

3) For each explanatory data field, set aside those segments that admit missing values for the explanatory field. If two or more segments remain, then repeatedly select and merge pairs of the remaining segments for the explanatory field so as to optimize the desired numerical criteria for selecting splitting factors subject to the following conditions:
   a) If at least one of the remaining segments does not satisfy the desired statistical constraints for segments, then at least one of the segments in the pair being merged must likewise not satisfy the statistical constraints.
   b) In the case of ordinal data fields, the values of the explanatory field that are admitted by the two segments being merged must be adjacent with respect to the ordering of the values for that ordinal explanatory field.
   Continue the merging process until only two segments remain (i.e., not including the segments that were set aside that admit missing values for the field). If one of these two remaining segments does not satisfy the desired statistical constraints for segments, then merge the two remaining segments into a single segment.

4) For each explanatory data field, set aside those segments that admit missing values for the explanatory field. If a single segment remains, then eliminate the explanatory data field from further consideration provided at least one of the following conditions hold:
   a) the single remaining segment does not satisfy the desired statistical constraints for segments;
   or
   b) the single remaining segment does indeed satisfy the desired statistical constraints for segments, but no segments were set aside that admit missing values for the explanatory field.

5) If all explanatory data fields were eliminated in step 4, then the larger segment cannot be divided into smaller segments that satisfy the desired statistical constraints for segments. Subdivision cannot be performed; therefore, stop any further attempt to divide the larger segment.

6) Otherwise, for each explanatory data field that was not eliminated from consideration in step 4, and for each smaller segment that was constructed for the explanatory field that was set aside in step 3 because it admits missing values, if the smaller segment does not satisfy the desired statistical constraints for segments, then assign to the smaller segment the segment model of the larger segment from which the smaller segment was originally obtained in step 1.

7) Select the explanatory data field that was not eliminated in step 4 for which the segments constructed for that data field optimize the desired numerical criteria for selecting splitting factors.

8) Divide the larger segment into the smaller segments constructed for the explanatory data field selected in step 7.

Step 1 is the same initial step performed by CHAID. Step 2 has no counterpart in CHAID, nor in any other prior art tree-based modeling technique. Step 2 is introduced in order to stabilize the merging process performed in step 3. The premerging performed in step 2 effectively eliminates spurious segments that are too small to meaningfully compare with other segments. The thresholds in step 2 should be set as small as possible, but large enough to yield meaningful comparisons among pairs of segments in step 3.

For example, in the case of personal lines property and casualty insurance, the only training record species that matters in the determination of actuarial credibility is the set of claim records. Consequently, only a single threshold needs to be considered in step 2 for this single species. Generally speaking, standard deviations of automobile insurance claim amounts tend to be about the same order of magnitude as mean claim amounts. In light of this very large variance in claim amounts, a minimum threshold of 6 claim records was found to be necessary to produce acceptable results. In general, actuarial credibility must be assessed relative to the specific type of insurance risk being modeled (see, for example, Klugman et al. above). A concrete example of how to assess actuarial credibility is presented below in the case of personal lines property and casualty insurance.

Steps 3 through 8 form the counterpart to the bottom-up merging process employed by CHAID. In our method, however, the process is constrained to always produce segments that satisfy desired statistical constraints on the segments (e.g., actuarial credibility constraints in the case of insurance risk modeling).

Figure 2:
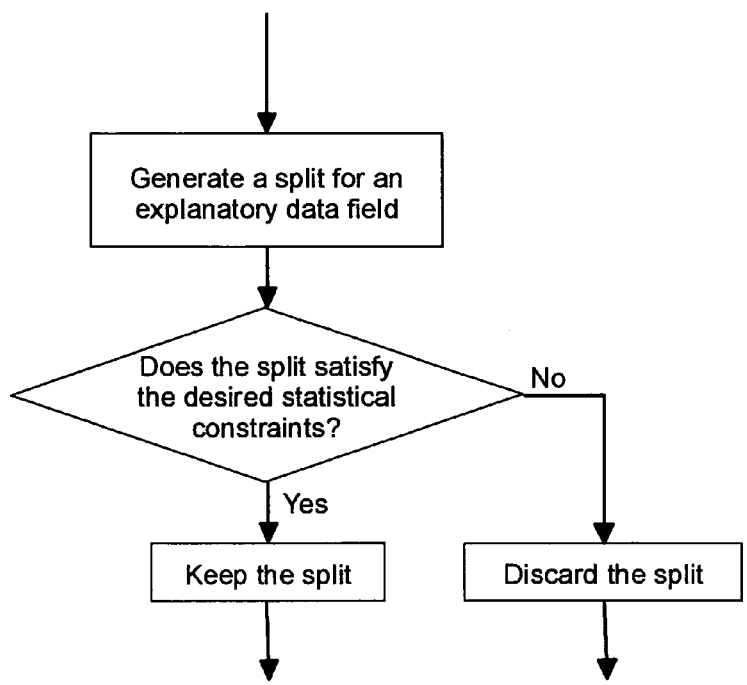
FIG. 2 provides an illustration of the open-loop approach used by prior art methods for splitting larger segments into smaller segments in such a way that the smaller segments satisfy desired constraints on the statistical properties of the segments.

An important aspect of the present invention that distinguishes it from prior art methods is the fact that statistical constraints are applied as an integral part of the method for splitting larger segments into smaller segments. Statistical constraints are applied as splits are being constructed in order to guide the construction process. In sharp contrast, prior art methods, such as CHAID (see Kass above, and Biggs et al. above), CART (see Breiman et al. above), C4.5 (see Quinlan, 1993, above), SPRINT (see Shafer et al. above), and QUEST (see W.-Y. Loh and Y.-S. Shih above), apply corresponding statistical constraints only after splits have been constructed. This methodology is illustrated in FIG. 2. A deficiency of this prior art method is that splits may be constructed that violate the statistical constraints, causing them to be eliminated from further consideration, even though it may have been possible to construct alternate splits that actually do satisfy the statistical constraints.

By using the statistical constraints to guide the construction of splits, our method is able to produce splits that satisfy the statistical constraints whenever it is feasible to do so. Our method thereby avoids premature termination of the segment refinement process caused by poor choices made during the construction of splits.

Figure 3:
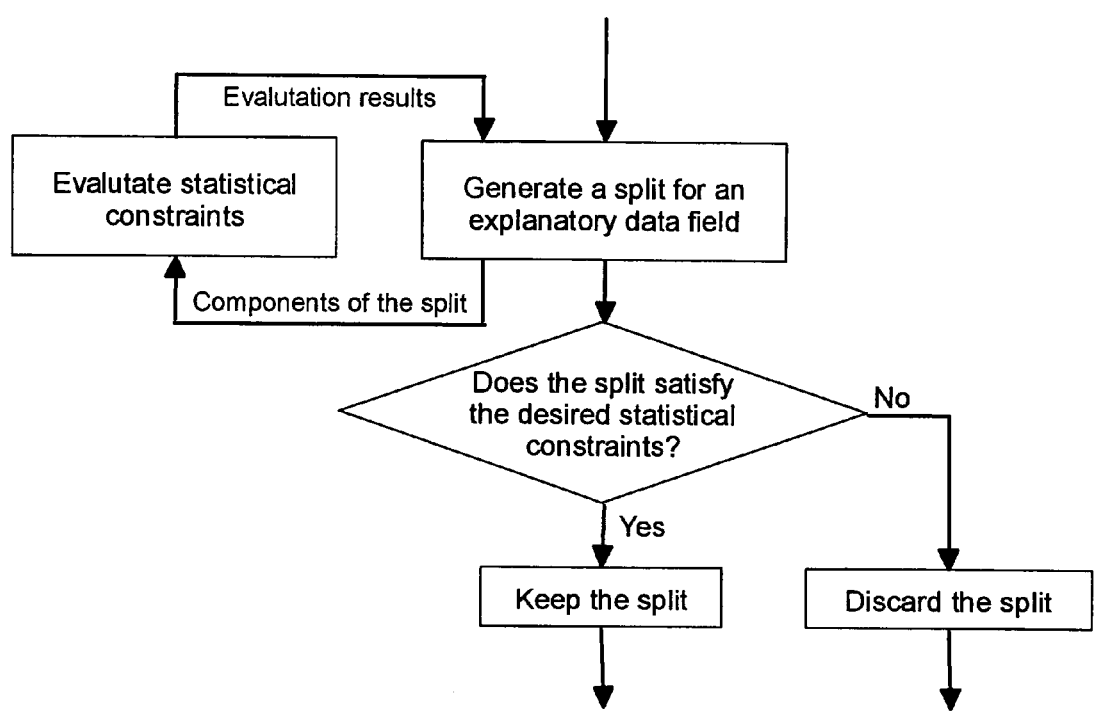
FIG. 3 provides an illustration of the closed-loop method disclosed by the present invention for splitting larger segments into smaller segments in such a way that the smaller segments satisfy desired constraints on the statistical properties of the segments.

The above distinction between the present invention and prior art is analogous to the distinction between closed-loop and open-loop control systems (see, for example, J. J. Distefano, A. R. Stubberud, and I. J. Williams above). The prior art approach is open-loop in the sense that the statistical constraints, which play the role of error signals, are evaluated only after the splits have been constructed (see FIG. 2). Poor choices made during the construction of the splits can result in segments that violate the statistical constraints even though it may have been possible to construct splits that satisfy the constraints. In the case of the present invention, on the other hand, the statistical constraints are repeatedly evaluated while constructing splits to determine whether or not they hold, and the results of the evaluations are used to regulate the construction process. This closed-loop methodology, which is illustrated in FIG. 3, ensures that the statistical constraints will be satisfied whenever it is feasible to do so.

Another distinguishing feature of the present invention is that complete flexibility is allowed in steps 3 through 8 with regard to the numerical criteria used to select splitting factors. The criteria need not be restricted to the chi-squared statistical significance criteria employed by CHAID. For example, in the illustrative example presented below, maximum likelihood criteria are used that are derived from a joint Poisson/log-normal statistical models of insurance risk.

The bottom-up merging process presented here also differs from the one used by CHAID in the way that missing values are treated. Steps 3 through 8 preferably construct separate segments for cases in which the values of explanatory data fields are missing. The CHAID approach of merging missing-value segments with other segments constructed on the basis of known values of the corresponding data field would bias the parameter estimates of the segment model for the merged segment. For insurance risk modeling purposes, actuaries generally prefer unbiased estimates of the risk parameters of each risk group (i.e., segment). For other applications, steps 3 through 8 could be modified to allow missing-value segments to be merged with other segments either by not setting missing-value segments aside in steps 3 through 8, or by performing an additional step between steps 3 and 4 to explicitly merge missing-value segments with other segments and then not setting missing-value segments aside in steps 4 through 8.

Another aspect in which the bottom-up merging process presented here differs from the one used by CHAID is that steps 3 through 8 always produces either one-way or two-way splits for non-missing values, whereas CHAID can produce multiway splits. The bottom-up merging process defined by steps 3 through 8 is designed in such a way that any multiway split that can be obtained by prematurely terminating step 3 can also be obtained by performing steps 3 through 8 several times on the same data field. However, after performing a two-way split on one data field, it is often the case that splitting on other data fields then produces more accurate predictive models than repeatedly splitting on the same data field (i.e., performing a multiway split). It is for this reason that multiway splits are not preferred in our invention.

To construct an overall predictive model, the above method for dividing larger segments into two or more smaller segments is first applied to the overall population of training records being considered. The splitting method is then repeatedly applied to each resulting segment until further applications of the splitting method are either no longer possible or no longer beneficial. The statistical constraints used by the splitting method provide one set of criteria that are used to decide when to stop splitting. However, another criterion must be applied to avoid overfitting.

Overfitting occurs when the best model relative to a set of training data tends to perform significantly worse when applied to new data. In the illustrative embodiment of the invention that is presented below, a negative log-likelihood criterion derived from a joint Poisson/log-normal model of the claims process. This negative log-likelihood criterion is essentially a score that measures the predictive accuracy of the model. Risk groups are identified by searching for splitting factors that minimize this score with respect to the training data. However, the score can be made arbitrarily small simply by introducing enough splitting factors. As more splitting factors are introduced, a point of overfitting is reached where the value of the score as estimated on the training data no longer reflects the value that would be obtained on new data. Adding splitting factors beyond this point would simply make the model worse.

Overfitting mathematically corresponds to a situation in which the score as estimated on the training data substantially underestimates the expected value of the score that would be obtained if the true statistical properties of the data were already known. Results from statistical learning theory (see, for example, V. N. Vapnik, *The Nature of Statistical Learning Theory*, New York: Springer-Verlag, 1995, and V. N. Vapnik, *Statistical Learning Theory*, New York: John Wiley & Sons, 1998) demonstrate that, although there is always some probability that underestimation will occur for any given model, both the probability and the degree of underestimation are increased by the fact that we explicitly search for the model that minimizes the estimated model score. This search biases the difference between the estimated model score and the expected value of that score toward the maximum difference among competing models.

Figure 4:
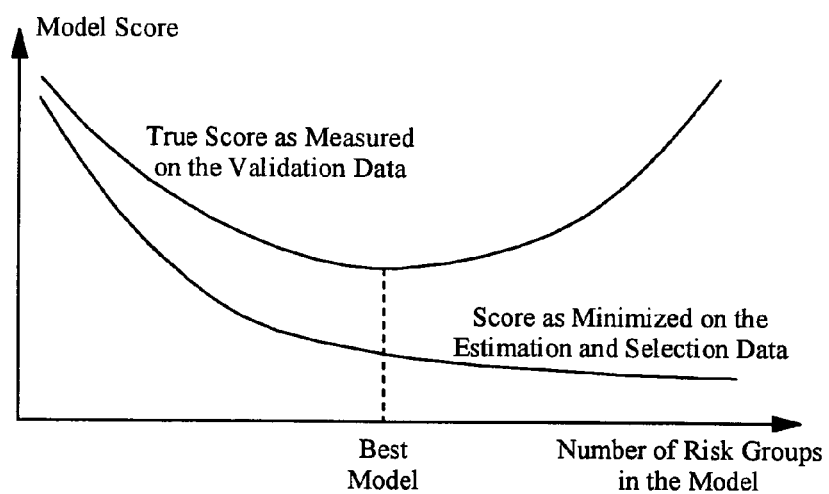
FIG. 4 provides an illustration of how the introduction of each successive splitting factor simultaneously increases the number of risk groups and decreases the score of the risk model on the portion of the training data used for estimating model parameters and selecting splitting factors, how the true scores of each of the resulting risk models are estimated on the portion of the training data used for validation purposes, and how the optimum risk model is selected by choosing the model with the smallest score on the validation data.

Our preferred method for avoiding overfitting involves randomly dividing the available training data into two subsets: one that is used for actual training (i.e., for selecting splitting factors and estimating the parameters of segment models); the other that is used for validation purposes to estimate to true performance of the model. As splitting factors are introduced by minimizing the score on the first of these subsets of training data, a sequence of predictive models is constructed in which each successive model contains more segments than its predecessors. The true score of each predictive model is then estimated by evaluating the negative log-likelihood criterion on the validation data for each segment in the predictive model and summing the results. The predictive model that minimizes this estimate of the true score is selected as the most accurate predictive model given the available training data. The overall process is illustrated in FIG. 4. The reduced error pruning method described by Quinlan (see J. R. Quinlan, "Simplifying decision trees," *International Journal of Man-Machine*

*Studies*, Vol. 27, pp. 221–234, 1987) provides an efficient approach for implementing the preferred method for avoiding overfitting.

It is important to note that the phenomenon illustrated in FIG. 4 occurs even though statistical constraints on the segments are incorporated into the method for selecting splitting factors. Such statistical constraints (e.g., actuarial credibility) do not prevent overfitting in and of themselves. A separate mechanism is needed to avoid overfitting, such as that described above.

To reduce the above method for constructing predictive models to a particularized expression, all that is required is to construct appropriate numerical criteria for selecting splitting factors, and to incorporate appropriate statistical constraints for the segments. The construction of these components will now be illustrated in the case of a joint Poisson/log-normal model suitable for personal lines property and casualty insurance. The same joint Poisson/log-normal model will then be used to illustrate the general method for construction profitability models from statistical models of insurance risk. Finally, an example will be presented to illustrate how statistical constraints can be developed for use with conventional statistical models; in particular, for weighted least-squares models of the kind found in prior art regression tree methods such as CART (see L. Breiman et al. above) and SPSS's implementation of CHAID (see, for example, http://www.SPSS.com).

The optimization criterion that will be constructed for identifying splitting factors is based on the principles of maximum likelihood estimation. Specifically, the negative log-likelihood of each data record is calculated assuming a joint Poisson/log-normal statistical model, and these negative log likelihoods are then summed to yield the numerical criterion that is to be optimized. Minimizing this negative log-likelihood criterion causes splitting factors to be selected that maximize the likelihood of the observed data given the joint Poisson/log-normal models of each of the resulting risk groups.

To derive equations for the negative log-likelihood criterion, it is necessary to examine the representation of claims data in more detail. Historical data for each policy must be divided into distinct time intervals for the purpose of predictive modeling, with one data record constructed per policy per time interval. Time-varying risk characteristics are assumed to remain constant within each time interval; that is, for all intents and purposes their values are assumed to change only from one time interval to the next. The choice of time scale is dictated by the extent to which this assumption is appropriate given the type of insurance being considered and the business practices of the insurer. For convenience, quarterly intervals will be assumed to help make the discussion below more concrete, but it should be noted that monthly or yearly intervals are also possible.

Assuming that data are divided into quarterly intervals, most data records will span entire quarters, but some will not. In particular, data records that span less than a full quarter must be created for policies that were initiated or terminated mid-quarter, or that experienced mid-quarter changes in their risk characteristics. In the case of the latter, policy-quarters must be divided into shorter time intervals so that separate data records are created for each change in the risk characteristics of a policy. This subdivision must be performed in order to maintain the assumption that risk characteristics remain constant within the time intervals represented by each data record.

One particular case in which subdivision must occur is when claims are filed under a policy in a given quarter. The filing of a claim can itself be an indicator of future risk (i.e., the more claims one files, the more likely one is to file future claims). Claim events must therefore be treated as risk characteristics that can change mid-quarter. However, claim events are special in that there is a second reason for subdividing policy-quarters when claims are filed. In order to reduce storage requirements, data records typically contain only one severity field per coverage. For example, in the case of automobile insurance, there would be one claim amount listed for property damage, one for bodily injury, one for collision, and so forth. Consequently, if one were to use a single record to represent information about two or more claims, one would only be able to record the total claims for each coverage, not the individual claim amounts. However, we need to know the individual claim amounts in order to correctly determine which claims involved which combinations of coverages. Both pieces of information—the exact combination of coverages for each claim and the individual claim amounts for each coverage—are needed to correctly estimate the frequency and severity parameters of the statistical models. Subdividing policy-quarters when claims are filed ensures that all relevant information about each claim is preserved.

The above method of decomposing policy and claims data into a collection of time intervals requires that the equations for calculating negative log-likelihoods be decomposed in a similar fashion. To motivate the decomposition, let us first consider the case in which there is a single homogeneous risk group whose risk characteristics remain constant over time. Policy-quarters are then subdivided only when claims occur.

Figure 5:
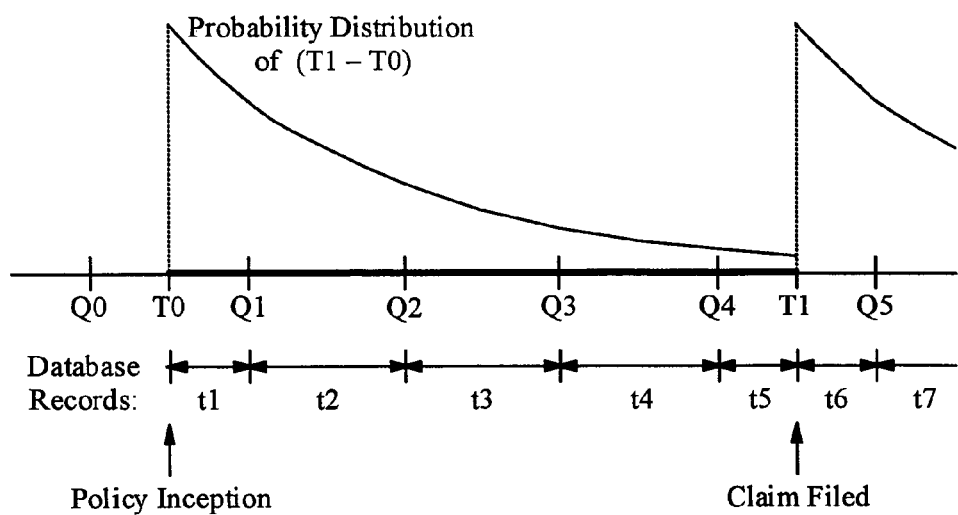
FIG. 5 provides an illustration of how policy-quarter data records must be subdivided for those quarters in which claims are filed.

FIG. 5 depicts the database records that are constructed in this situation. Q0, Q1, Q2, etc., represent the ending days of a sequence of quarters. T0 represents the day on which a particular policy came into force, while T1 represents the day the first claim was filed under that policy. Though not illustrated, T2, T3, T4, etc., would represent the days on which subsequent claims were filed. For modeling purposes, the policy claims data is divided into a sequence of database records with earned exposures t1, t2, t3, etc.

As FIG. 5 illustrates, new policies typically come into force in the middle of quarters. Thus, the earned exposure for the first quarter of a policy's existence (e.g., t1) is generally less than a full quarter. The earned exposures for subsequent quarters, on the other hand, correspond to full quarters (e.g., t2, t3, and t4) until such time that a claim is filed or the policy is terminated. When a claim is filed, the data for that quarter is divided into two or more records. The earned exposure for the first database record (e.g., t5) indicates the point in the quarter at which the claim was filed. The earned exposure for the second record (e.g., t6) indicates the time remaining in the quarter, assuming only one claim is filed in the quarter as illustrated in the diagram. If two or more claims are filed in the quarter, then three or more database records are constructed: one record for each claim and one record for the remainder of the quarter (assuming that the policy has not been terminated).

For Poisson random processes, the time between claim events follows an exponential distribution. Moreover, no matter at what point one starts observing a Poisson process, the time to the next claim event has the same exponential distribution as the time between claim events. For the example shown in FIG. 5, the probability density function $f$ for the time (T1−T0) between the policy inception and the first claim being filed is given by $$f(T1-T0) = \lambda e^{-\lambda(T1-T0)} = \lambda e^{-\lambda(t1+t2+t3+t4+t5)},$$

where $\lambda$ is the claim frequency of the risk group. This probability density function can be decomposed to reflect the earned exposures of each database record by using the chain rule of probability theory in the following manner:

$$f(T1-T0) = P\{T1-T0 > t1\} \cdot P\{T1-T0 > t1 + t2 \mid T1-T0 > t1\}$$
$$\cdot P\{T1-T0 > t1 + t2 + t3 \mid T1-T0 > t1 + t2\}$$
$$\cdot P\{T1-T0 > t1 + t2 + t3 + t4 \mid T1-T0 > t1 + t2 + t3\}$$
$$\cdot f\{T1-T0 > t1 + t2 + t3 + t4 + t5 \mid T1-T0 > t1 + t2 + t3 + t4\}$$
$$= e^{-\lambda(t1)} \cdot e^{-\lambda(t2)} \cdot e^{-\lambda(t3)} \cdot e^{-\lambda(t4)} \cdot e^{-\lambda(t5)}$$
$$= \lambda e^{-\lambda(t1+t2+t3+t4+t5)}$$
$$= \lambda e^{-\lambda(T1-T0)}$$

Thus, according to this decomposition, each nonclaim record (i.e., one that does not describe a claim event) can be assigned a probability of $e^{-\lambda t}$, where t is the earned exposure of that record. Each claim record, on the other hand, can be assigned a probability density of $\lambda e^{-\lambda t}$. The probability density for the time of the first claim filing is then obtained by multiplying these assigned probabilities/densities.

The above decomposition likewise holds for two or more claims. Suppose that a total of k+l claim have been observed, where k is the number of fully settled claims and l is the number of claims that are still open. The probability density for the time T between k+l claim filings is given by $$f(T|k+l) = \lambda^{k+l} e^{-\lambda T}. \quad (1)$$

The same probability density is obtained by multiplying the probabilities/densities assigned to the individual database records that are involved. As a result of the multiplication, T will equal the total earned exposure as calculated from the database records, and k+l will equal the total number of claim records. The important thing to note about this density function is that it is not the exact times at which the claims are filed that matters in the calculation, what matters are the number of claims and the total earned exposure.

Although the decomposition developed above was motivated by assuming that only one risk group exists, the decomposition also holds for multiple risk groups. In the latter case, each database record is assigned to a risk group according to the risk characteristics that define each group. The probability density function for the total earned exposure of a risk group is then calculated by multiplying the probabilities/densities assigned to the database records within the risk group. The resulting probability density function has the same form as that given in Equation (1).

The maximum likelihood estimate of the frequency parameter $\lambda$ is obtained by maximizing the value of Equation (1). The resulting formula for estimating $\lambda$ is the same one that is typically used by actuaries:

$$\hat{\lambda} = \frac{k+l}{T} \quad (2)$$
$$= \frac{\text{Total Number of Claims}}{\text{Total Earned Exposure}}.$$

The probability functions that govern claim severity are somewhat easier to derive. In the case of nonclaim records, the severity s is always zero by definition. Thus, $$P\{s=0 | \text{Nonclaim Record}\}=1,$$
$$P\{s \neq 0 | \text{Nonclaim Record}\}=0. \quad (3)$$

In the case of claim records, the severity is assumed to follow a log-normal distribution, which is defined by the following probability density function:

$$f(s) = \frac{1}{s\sqrt{2\pi}\,\sigma_{\log}} \cdot e^{-\frac{(\log(s)-\mu_{\log})^2}{2\sigma_{\log}^2}}, \quad (4)$$

where log(s) is the natural logarithm of s (i.e., base e), $\mu_{log}$ is the mean of log(s), and $\sigma_{log}^2$ is the variance of log(s). The mean $\mu$ and variance $\sigma^2$ of the severity s are related to the mean and variance of the log severity by the following equations:

$$\mu = e^{\mu_{\log} + \frac{1}{2}\sigma_{\log}^2},$$
$$\sigma^2 = \mu^2\left(e^{\sigma_{\log}^2} - 1\right).$$

Equations (3) and (4) define a probability decomposition for severity that is analogous to the one developed above for frequency. In this case, each nonclaim record is assigned a probability of one as per Equation (3), while each fully settled claim record is assigned the probability density defined by Equation (4). The product of these probabilities/densities yields the joint probability density function for the severities of the settled claims that were filed (open claims are treated separately as discussed below):

$$f(s_1,\ldots,s_k) = \frac{1}{\left(\sqrt{2\pi}\,\sigma_{\log}\right)^k \prod_{i=1}^{k} s_i} \cdot e^{-\frac{\sum_{i=1}^{k}(\log(s_i)-\mu_{\log})^2}{2\sigma_{\log}^2}},$$

where k is the number of settled claims and $s_1,\ldots,s_k$ are the claim amounts. Note that this method of calculation assumes that the severities are statistically independent and identically distributed random variables, which is an appropriate assumption for homogeneous risk groups.

Given the joint probability density function above, the mean and variance of the log severity are estimated using the equations $$\hat{\mu}_{\log} = \frac{1}{k}\sum_{i=1}^{k} \log(s_i) \text{ and} \quad (5)$$

$$\hat{\sigma}_{\log}^2 = \frac{1}{k-1}\sum_{i=1}^{k} (\log(s_i) - \hat{\mu}_{\log})^2, \quad (6)$$

respectively. Equations (5) and (6) are used during training to estimate the parameters of the loss distribution for individual claims defined by Equation (4). These estimators presume that the individual loss distributions are log-normal. Aggregate losses, however, are presumed to be normally distributed as previously discussed. The usual unbiased estimators for the mean and variance of the severity are therefore used after the risk model has been constructed in order to estimate the parameters of the aggregate loss distributions:

$$\hat{\mu} = \frac{1}{k}\sum_{i=1}^{k} s_i \quad (7)$$

$$\hat{\sigma}^2 = \frac{1}{k-1}\sum_{i=1}^{k}(s_i - \hat{\mu})^2. \quad (8)$$

It is important to note that only fully settled claims should be considered when applying Equations (5–8). The severity fields of unsettled claims are often used to record reserve amounts; that is, the money that insurers hold aside to cover pending claims. Reserve amounts are not actual losses, nor should they be used to develop models for predicting actual losses.

As mentioned earlier, negative log-likelihoods are calculated for each database record in a risk group. The nonconstant terms in the negative log-likelihoods are then summed and used as the criterion for selecting splitting factors in the top-down identification of risk groups. The constant terms, on the other hand, do not contribute to the selection of splitting factors and are omitted to avoid unnecessary computation.

The negative log-likelihood of database record i is given by $$-\log[g(t_i)g(s_i)] = -\log[g(t_i)] - \log[g(s_i)],$$

where $g(t_i)$ and $g(s_i)$ are the probabilities/densities assigned to record i for the earned exposure $t_i$ and the severity $s_i$, respectively, of record i. From the discussion above, $$-\log[g(t_i)] = \begin{cases} \lambda t_i, & \text{for non-claim records} \\ \lambda t_i - \log(\lambda), & \text{for claim records} \end{cases} \quad (9)$$

and $$-\log[g(s_i)] = \begin{cases} 0, & \text{for non-claim records} \\ \log(\sqrt{2\pi}\,s_i) + \log(\sigma_{\log}) + \frac{(\log(s_i) - \mu_{\log})^2}{2\sigma_{\log}^2}, & \text{for settled claim records.} \end{cases} \quad (10)$$

To obtain the optimization criterion, the first thing to note about the above equations is that, when summed over all risk groups, the $\log(\sqrt{2\pi}\,s_i)$ terms obtained from Equation (10) are constant across all possible ways of dividing policyholders into risk groups. The values of these terms depend only on the severities of the claims and not on the parameters of the risk groups. These terms can therefore be dropped for optimization purposes. After removing constant terms, the negative log-likelihood of severity for settled claim records becomes $$\log(\sigma_{\log}) + \frac{(\log(s_i) - \mu_{\log})^2}{2\sigma_{\log}^2}.$$

The second thing to note in deriving an optimization criterion is that, in the case of open claim records, the value of the settled claim amount $s_i$ in the above formula is unknown. However, open claim records are still highly relevant with regard to selecting splitting factors; in particular, they used in Equation (9) for calculating the negative log-likelihood of the earned exposure. For open claim records, an estimated negative log-likelihood of severity is therefore calculated by taking the expected value of the formula for settled claim records. The expected value is $$\log(\sigma_{log}) + \tfrac{1}{2},$$

which, after removing constant terms, reduces to $$\log(\sigma_{log}).$$

When combined, the above formulas yield the following equation for the negative log-likelihood of database record i with constant terms removed:

$$\xi_i = \begin{cases} \lambda t_i, & \text{for non-claim records} \\ \lambda t_i + \log\!\left(\frac{\sigma_{\log}}{\lambda}\right), & \text{for open claim records} \\ \lambda t_i + \log\!\left(\frac{\sigma_{\log}}{\lambda}\right) + \frac{(\log(s_i) - \mu_{\log})^2}{2\sigma_{\log}^2}, & \text{for settled claim records.} \end{cases} \quad (11)$$

Equation (11) can be thought of as the score of the i'th database record. If the records for a risk group contain k settled claims and l open claims, then the sum of these scores is given by $$\xi = \lambda\left(\sum_{i=1}^{N} t_i\right) + (k+l)\log\!\left(\frac{\sigma_{\log}}{\lambda}\right) + \left(\frac{1}{2\sigma_{\log}^2}\right)\sum_{i=1}^{k}(\log(s_i) - \mu_{\log})^2, \quad (12)$$

where N is the total number of database records for the risk group, the first k of which are assumed for convenience to be the settled claim records. the score of the overall risk model is obtained by summing Equation (12) over all risk groups. Risk models are constructed by minimizing this overall score in a stepwise fashion, where each step involves dividing a larger risk group into two or more smaller risk groups so as to reduce the value of the overall score to the maximum extent possible.

In addition to supplying numerical criteria for selecting risk factors, such as Equation (12), an appropriate test for actuarial credibility must also be provided to reduce the invention a particularized method for constructing risk models. Actuarial credibility (see, for example, Klugman et al. above) has to do with the accuracy of the estimated risk parameters—in this case, frequency, severity, and ultimately pure premium. Accuracy is measured in terms of statistical confidence intervals; that is, how far can the estimated risk parameters deviate from their true values and with what probability. A fully credible estimate is an estimate that has a sufficiently small confidence interval. In particular, estimated parameter values X must be within a certain fraction r of their true (i.e., expected) values E[X] with probability at least p:

$$P\left\{\left|\frac{X - E[X]}{E[X]}\right| \le r\right\} \ge p.$$

Typical choices of r and p used by actuaries are r=0.05 and p=0.9. In other words, X must be within 5% of E[X] with 90% confidence.

The above credibility constraint can be converted to an equivalent, more convenient constraint on the variance of X. For any combination of values for r and p, there exists a value for r' such that $$P\left\{\left|\frac{X - E[X]}{E[X]}\right| \le r\right\} \ge p$$

$$\frac{\sqrt{\mathrm{Var}[X]}}{E[X]} \le r'.$$

The value of r' is essentially the maximum allowed fractional standard error of X. For example, if p=0.9 and X has a Gaussian distribution, then the 90% confidence interval for X is ±1.645 times the standard deviation of X centered about its mean. If in addition r=0.05, then $$r' = \frac{r}{1.645} = \frac{0.05}{1.645} = 0.0304. \quad (13)$$

Thus, X will be within 5% of E[X] with 90% confidence provided the standard error of X is within 3.04% of E[X].

To ensure that actuarially credible risk groups are constructed, a limit can be placed on the maximum fractional standard error for the estimated pure premiums of each risk group. The method of subdividing larger risk groups into smaller risk groups will then ensure that this constraint will be obeyed by all of the risk groups that are produced. Actuarial credibility is thus ensured. The ability to impose actuarial credibility constraints on the top-down process by which risk groups are constructed is another important feature that distinguishes the present invention from all other tree-based modeling methods.

To derive equations for the credibility constraint, let us ignore the issue of open claims for the moment and simply suppose that K claims are filed by a given risk group with severities $S_1, \ldots, S_K$. Suppose further that T is the total earned exposure over which these observations were made. Then the estimated pure premium X for the risk group is given by $$X = \frac{1}{T}\sum_{i=1}^{K} S_i.$$

As is usually the case in practice, T is assumed to be given while K and $S_1, \ldots, S_K$ are random variables. The expected value of the pure premium estimate given K is simply $$E[X|K] = E\left[\frac{1}{T}\sum_{i=1}^{K} S_i \Big| K\right] = \frac{1}{T}\sum_{i=1}^{K} E[S_i] = \frac{1}{T}\sum_{i=1}^{K} \mu = \frac{K\mu}{T},$$

where μ is the mean severity. The (unconditional) expected pure premium is thus $$E[X] = E_K[E[X|K]] = E\left[\frac{K\mu}{T}\right] = \frac{\lambda T \mu}{T} = \lambda \mu,$$

where λ is the claim frequency. Similarly, the expected square of the pure premium estimate given K is $$E[X^2|K] = E\left[\left(\frac{1}{T}\sum_{i=1}^{K} S_i\right)^2 \Big| K\right]$$

$$= \frac{1}{T^2}\left(\sum_{i=1}^{K} E[S_i^2] + \sum_{i=1}^{K}\sum_{\substack{j=1 \\ j \ne i}}^{K} E[S_i]E[S_j]\right)$$

$$= \frac{1}{T^2}\left(\sum_{i=1}^{K} (\sigma^2 + \mu^2) + \sum_{i=1}^{K}\sum_{\substack{j=1 \\ j \ne i}}^{K} \mu^2\right)$$

$$= \frac{K\sigma^2 + K^2\mu^2}{T^2},$$

where $\sigma^2$ is the variance of severity. The (unconditional) expected square of the pure premium estimate is thus $$E[X^2] = E_K[E[X^2|K]] =$$

$$E\left[\frac{K\sigma^2 + K^2\mu^2}{T^2}\right] = \frac{\lambda T \sigma^2 + (\lambda T + \lambda^2 T^2)\mu^2}{T^2} = \frac{\lambda(\sigma^2 + \mu^2)}{T} = \lambda^2\mu^2.$$

Combining the above equations yields the following formula for the fractional standard error of the pure premium estimate:

$$\frac{\sqrt{\mathrm{Var}[X]}}{E[X]} = \quad (14)$$

-continued $$\sqrt{\frac{E[X^2] - E[X]^2}{E[X]^2}} = \sqrt{\frac{\lambda(\sigma^2 + \mu^2)}{\lambda^2 T \mu^2}} = \sqrt{\frac{1}{\lambda T}\left(1 + \frac{\sigma^2}{\mu^2}\right)}.$$

In the above equation, note that $\lambda T$ is the expected number of claims filed by the policyholders in a risk group given a total earned exposure of T. An upper bound on the fractional standard error of the pure premium estimate can thus be expressed in terms of an equivalent lower bound on the expected number of claims filed:

$$\frac{\sqrt{\text{Var}[X]}}{E[X]} \le r'$$

$$\lambda T \ge \frac{1}{(r')^2}\left(1 + \frac{\sigma^2}{\mu^2}\right).$$

For example, setting r' to the value given in Equation (13) yields the lower bound typically used by actuaries when constructing risk models for property and casualty insurance (see, for example, Klugman et al. above):

$$\lambda T \ge \left(\frac{1.645}{0.05}\right)^2\left(1 + \frac{\sigma^2}{\mu^2}\right) = 1082.41\left(1 + \frac{\sigma^2}{\mu^2}\right).$$

To generalize Equation (14) to the case in which some of the claims are not fully settled, it is useful to note that, when Equation (14) is applied in practice, $\lambda$, $\mu$, and $\sigma$ are replaced with their estimated values $\hat{\lambda}$, $\hat{\mu}$, and $\hat{\sigma}$ given by Equations (2), (7), and (8), respectively:

$$\frac{\sqrt{\text{Var}[X]}}{E[X]} \approx \sqrt{\frac{1}{k}\left(1 + \frac{\hat{\sigma}^2}{\hat{\mu}^2}\right)} = \sqrt{\frac{1}{k} + \frac{1}{\hat{\mu}^2}\left(\frac{\hat{\sigma}^2}{k}\right)}.$$

For the moment, the number of open claims l is assumed to be zero. In the above expression, the 1/k term is the fractional standard error squared of the frequency estimate, as evidenced by the fact that $$\frac{\text{Var}[\hat{\lambda}]}{E[\hat{\lambda}]^2} = \frac{\frac{\lambda T}{T^2}}{\lambda^2} = \frac{1}{\lambda T} \approx \frac{1}{k}.$$

The $\hat{\sigma}^2/k$ term is the standard error of the estimated mean $\hat{\mu}$, so that $\hat{\sigma}^2/\hat{\mu}^2 k$ is the fractional standard error squared of the severity estimate.

When the number of open claims l is greater than zero, the fractional standard error squared of the severity estimate remains the same because only settled claims are used to estimate severity; however, the fractional standard error squared of the frequency estimate now becomes $$\frac{\text{Var}[\hat{\lambda}]}{E[\hat{\lambda}]^2} = \frac{1}{\lambda T} \approx \frac{1}{k+l}.$$

An appropriate generalization of Equation (14) that accounts for open claim records is therefore $$\frac{\sqrt{\text{Var}[X]}}{E[X]} \approx \sqrt{\frac{1}{k+l} + \frac{1}{k}\left(\frac{\hat{\sigma}^2}{\hat{\mu}^2}\right)}.$$

The above equation can be further specialized by making use of the fact that, for log-normal distributions, $$\frac{\sigma^2}{\mu^2} = \left(e^{\sigma_{\log}^2} - 1\right).$$

The credibility constraint for joint Poisson/log-normal models therefore simplifies to $$\frac{\sqrt{\text{Var}[X]}}{E[X]} \approx \sqrt{\frac{1}{k+l} + \frac{1}{k}\left(e^{\hat{\sigma}_{\log}^2} - 1\right)} \le r'. \quad (15)$$

For computational reasons, it is often desirable to identify risk groups based on accident-enriched, stratified training data sets. Stratified sampling has the benefit of reducing the amount of computation that is required, but it biases the values of the model parameters that are estimated for each risk group. After a risk model is constructed on the basis of stratified data, a postprocessing step is recommended to obtain unbiased estimates of the model parameters on a separate, unstratified calibration data set.

When setting the value of r' in such cases, actuaries will likely be thinking in terms of the maximum fractional standard error of pure premium after calibration is performed. However, the constraint is applied only during training. Assuming that the resulting risk groups are indeed credible, we would expect the ratios of training claim records to calibration claim records to be approximately the same across risk groups. In other words, we would expect that, for any given risk group, $$\frac{k_{training}}{k_{calibration}} \approx \frac{(k+l)_{training}}{(k+l)_{calibration}} \approx \frac{\kappa_{training}}{\kappa_{calibration}},$$

where $\kappa_{training}$ and $\kappa_{calibration}$ are the total numbers of claim records in the training and calibration data sets, respectively. We would likewise expect that the variance of the log severities of each risk group remains about the same when estimated on training data versus calibration data. These approximate equalities suggests that, if Equation (15) holds on the calibration data, then the following relationship should likewise hold on the training data:

$$r'_{calibration} \geq \sqrt{\frac{1}{(k+l)_{calibration}} + \frac{1}{k_{calibration}}\left(e^{\hat{\sigma}^2_{log}} - 1\right)}$$

$$\approx \sqrt{\frac{\kappa_{training}}{\kappa_{calibration}}} \sqrt{\frac{1}{(k+l)_{training}} + \frac{1}{k_{training}}\left(e^{\hat{\sigma}^2_{log}} - 1\right)}.$$

Assuming the above relationship does indeed hold, the appropriate credibility constraint for the training data would therefore be $$r'_{calibration} \sqrt{\frac{\kappa_{calibration}}{\kappa_{training}}} \geq \sqrt{\frac{1}{(k+l)_{training}} + \frac{1}{k_{training}}\left(e^{\hat{\sigma}^2_{log}} - 1\right)}.$$

The above constraint motivates the following equation:

$$r'_{training} = r'_{calibration} \sqrt{\frac{\kappa_{calibration}}{\kappa_{training}}} \quad (16)$$

$$= r'_{calibration} \sqrt{\frac{\text{Number of Claim Records in the Calibration Set}}{\text{Number of Claim Records in the Training Set}}}.$$

Equation (16) provides a method for determining the value of r' to use on the training data during model construction given the desired value of r' to be achieved on the calibration data.

The joint Poisson/log-normal model presented above is suitable for constructing new risk models from scratch independent of existing risk models or price structures. However, in practice, actuaries often face a somewhat different problem: that of diagnosing an existing risk model or price structure to identify risk factors that are being overlooked and that would significantly affect the premiums of various policyholders if were they taken into account. For example, an insurer might have a book of business that is performing below expectations—the book might even be losing money—but no one knows why. One could approach this problem by constructing an entirely new risk model from scratch and developing a new price structure accordingly; however, that would still not identify the cause(s) of the existing problem. Moreover, tremendous amounts of time and effort are often required to obtain approvals from state insurance regulators before new price structures can be put into effect. In the mean time, an insurer could be losing money, market share, or both.

A desirable alternative is to identify the source of the problem and devise small changes to the existing price structure to fix the problem. Small changes are more likely to receive quick approval from state regulators. In addition, they are more likely to have minimal impact on the majority of policyholders, which is an important consideration from the point of view of customer satisfaction. Even in cases where a new price structure might in fact be warranted, it is still desirable to identify a quick fix in order to remain solvent while a new structure is being developed and approved.

The joint Poisson/log-normal model in the form presented above is not sufficient to address this problem directly because it does not take existing prices into consideration. However, the model can be modified to produce a more sophisticated statistical model that takes an insurer's existing price structure into account in order to model the profitability of policyholders. The numerical criteria derived from this more sophisticated statistical model would then cause the method for dividing larger risk groups into smaller risk groups to segment policyholders according to their levels of profitability. In the process, risk factors would be identified that distinguish the most profitable policyholders from the least profitable ones. Thus, the resulting particularized expression of the invention would explicitly search for and identify risk factors that are not already taken into account in an insurer's existing price structure.

Insurers typically measure profitability in terms of loss ratio, which is the ratio of total claims paid over total premiums collected, or equivalently the ratio of estimated pure premium over the average premium charged per unit time:

$$\text{Loss Ratio} = \frac{\text{Incurred Claims}}{\text{Earned Premiums}}$$

$$= \frac{\text{Incurred Claims}}{\text{Earned Exposure}} \cdot \frac{\text{Earned Exposure}}{\text{Earned Premiums}}$$

$$= \frac{\text{Estimated Pure Premium}}{\text{Average Premium Charged per Unit Time}}.$$

Loss ratio is related to gross profit margin by the following equation:

$$\text{Gross Profit Margin} = \frac{\text{Earned Premiums} - \text{Incurred Claims}}{\text{Earned Premiums}}$$

$$= 1 - \text{Loss Ratio}.$$

Although loss ratios can be reliably estimated only for entire risk groups or books of business, the relationship between loss ratio and pure premium defined above does permit loss ratios of individual policyholder to be defined in the following manner:

$$L = \frac{\lambda \mu}{p},$$

where L is the loss ratio of an individual policyholder, p is the premium charged to the policyholder per unit time, and $\lambda$ and $\mu$ are the frequency and mean severity parameters, respectively, that are ascribed to the policyholder by a suitable statistical model. Risk models are traditionally used to ascribe frequency and mean severity parameters to individual policyholders. To segment policyholders by loss ratio instead of by risk, one simply needs to change the nature of the statistical models that are used to ascribe frequencies and severities to individuals. To motivate the changes that are required, it is useful to examine the differences between risk modeling and loss ratio modeling in more detail.

When developing new price structures property and casualty insurance, risk models are first constructed that divide policyholders into homogeneous risk groups according to their frequency and severity characteristics. Appropriate premiums are then determined for these risk groups in order to achieve desired loss-ratio targets. However, when diagnosing existing price structures, the premiums have already been decided and we are not interested in developing yet another risk model. Instead, we want to group policyholders into population segments according to their actual loss ratio performance. In other words, each segment might include policyholders from several known risk groups, but all policyholders in a segment should exhibit the same loss ratio. The definitions of the segments would then define risk characteristics that are not reflected in the price structure.

In order to segment policyholders according to their individual loss ratios, we develop mathematical models that allow different policyholders within a segment to have different frequency and mean severity parameters, and yet require all policyholders within a segment to have the same loss ratio. Such models can be constructed by treating the frequency and mean severity parameters of individual policyholders as functions of the premiums they are charged. Each segment would have its own frequency and severity functions. Within each segment, the frequency and severity functions would be constrained by the loss ratio of the segment so as to obey the following equation:

$$\lambda(p) \cdot \mu(p) = L \cdot p, \tag{17}$$

where L is the loss ratio of the segment, and where $\lambda(p)$ and $\mu(p)$ are the functions that define the frequency and mean severity parameters, respectively, of the policyholders in the segment as a function of the premiums p that are charged to the policyholders per unit time.

The importance of Equation (17) is that it enables appropriate statistical models to be readily constructed for the purpose of segmenting policyholders by loss ratio. In particular, the same frequency-severity models used to construct risk models can be adapted for use in loss-ratio modeling by simply replacing the frequency and mean severity parameters that appear in those models with frequency and mean severity functions that satisfy Equation (17). For example, the frequency and mean severity parameters could be replaced with functions of the forms $$\lambda(p) = \alpha \cdot p^q \tag{18}$$

and $$\mu(p) = \beta \cdot p^{1-q}, \tag{19}$$

respectively, where $\alpha$, $\beta$, and q are function parameters. These function parameters could then be estimated using maximum likelihood techniques in much the same manner as standard frequency and severity parameters. Once values for the function parameters have been determined, the loss ratio of a segment would be given by the product of the $\alpha$ and $\beta$ parameters for that segment: $L = \alpha \cdot \beta$.

Equations (18) and (19) constitute what is perhaps the simplest class of parametric functions that satisfy Equation (17). They are used below as the basis for developing a loss-ratio model from the joint Poisson/log-normal model presented above. It is also possible to use more elaborate functions, but not without a significant increase in the complexity of the parameter estimation problem.

For other forms of insurance involving risk parameters other than frequency and severity, the same general approach can be employed to convert statistical models of insurance risk for use in profitability modeling. All that is required is to replace the risk parameters in these models with parametric functions of premium charged that are analogous to Equations (18) and (19). Estimation techniques similar to those presented below for the joint Poisson/log-normal model would then be used to estimate the parameters of these functions and to calculate the numerical criteria (e.g., negative log-likelihood criteria) needed to identify splitting factors.

When Equation (18) is introduced into the joint Poisson/log-normal model, the negative log-likelihood of the earned exposure $t_i$ of database record i as defined by Equation (9) becomes $$-\log[g(t_i)] = \begin{cases} t_i \alpha(p_i)^q, & \text{for non-claim records} \\ t_i \alpha(p_i)^q - \log(\alpha) - q\log(p_i), & \text{for claim records,} \end{cases} \tag{20}$$

where $p_i$ = Average Premium Charged per Unit Time for Record $i$ $= \dfrac{\text{Earned Premium of Record } i}{\text{Earned Exposure of Record } i}.$ To calculate the negative log-likelihood of severity, Equation (19) must first be transformed into an equivalent formula for mean log severity before it can be substituted into Equation (10). For log-normal distributions, $$\mu_{log} = \log(\mu) - \tfrac{1}{2}\sigma_{log}^2.$$

Thus, from Equation (19), $$\begin{aligned} \mu_{log}(p) &= \log(\beta \cdot p^{1-q}) - \frac{1}{2}\sigma_{log}^2 \\ &= \log(\beta) + (1-q)\log(p) - \frac{1}{2}\sigma_{log}^2 \\ &= (1-q)\log(p) + \left[\log(\beta) - \frac{1}{2}\sigma_{log}^2\right]. \end{aligned} \tag{21}$$

In general, the variance of the log severity $\sigma_{log}^2$ could also be treated as a function of the premium charged. However, the value of this variance was found to be fairly constant across risk groups in one examination we made of insurance data. Therefore, for the sake of simplicity, we will assume that the variance is independent of the premium charged, enabling $\sigma_{log}^2$ to be treated as a straightforward parameter.

Because, $\beta$ and $\sigma_{log}^2$ are both parameters, Equation (21) can be reparameterized as follows in terms of a new parameter $\gamma$ $$\mu_{log}(p) = (1-q)\log(p) + \gamma, \tag{22}$$

where $$\gamma = \log(\beta) - \tfrac{1}{2}\sigma_{log}^2, \tag{23}$$

which implies that $$\beta = e^{\gamma + 1/2\sigma_{log}^2}, \quad (24)$$

This reparameterization turns out to be more convenient from the point of view of obtaining maximum likelihood estimates of all parameters. Because Equations (23) and (24) define a one-to-one mapping between $\gamma$ and $\beta$ given a value for $\sigma_{log}^2$, there is a one-to-one mapping between the original set of parameters ($\alpha$, $\beta$, $\sigma_{log}^2$, q) and the new set of parameters ($\alpha$, $\gamma$, $\sigma_{log}^2$, q). Consequently, estimating the new parameters using maximum-likelihood techniques and then calculating $\beta$ using Equation (24) yields the same maximum-likelihood estimates of $\alpha$, $\beta$, $\sigma_{log}^2$ and q that would be obtained using direct techniques.

Given this reparameterization, the equation for the negative log-likelihood of the severity $s_i$ of the i'th database record can be obtained by substituting Equation (22) into Equation (10):

$$-\log[g(s_i)] = \begin{cases} 0, & \text{for non-claim records} \\ \log(\sqrt{2\pi}\, s_i) + \log(\sigma_{log}) & \\ + \dfrac{(\log(s_i) - (1-q)\log(p_i) - \gamma)^2}{2\sigma_{log}^2}, & \text{for settled claim records.} \end{cases} \quad (25)$$

As before, the $\log(\sqrt{2\pi}\, s_i)$ term is independent of the values of the model parameters. When summed over all database records, the value of this term is constant over all ways of segmenting policyholders into separate groups. The term can therefore be dropped for the purpose of optimizing the segmentation. After removing constant terms, the negative log-likelihood of severity for settled claim records therefore becomes $$\log(\sigma_{log}) + \frac{(\log(s_i) - (1-q)\log(p_i) - \gamma)^2}{2\sigma_{log}^2}.$$

In the case of open claim records, the value of the severity $s_i$ in the above formula is unknown. As before, an estimated negative log-likelihood of severity is therefore calculated. However, rather than using the expected value of the negative log-likelihood of severity for settled claims as the estimate for open claims, the average value for the settled claim records is used instead:

$$\log(\sigma_{log}) + \frac{\dfrac{1}{k}\sum_{i=1}^{k}(\log(s_i) - (1-q)\log(p_i) - \gamma)^2}{2\sigma_{log}^2},$$

where the first k database records for the segment in the training data are assumed for convenience to be the settled claim records. This particular estimate has the desirable benefit that the maximum likelihood estimates of $\gamma$ and $\sigma_{log}^2$ (and, hence, $\beta$) depend only on the settled claim records and are not affected by open claims, as demonstrated below in Equations (29) and (30). Note that, because $\beta$ depends on $\gamma$ and $\sigma_{log}^2$ as per Equation (24), both $\gamma$ and $\sigma_{log}^2$ must be estimated using maximum likelihood techniques in order to obtain a maximum likelihood estimate of $\beta$. The usual unbiased estimator for variance is not appropriate in this instance.

Combining the above formulas with Equation (20) yields the following equation for the negative log-likelihood of database record i with constant terms removed:

$$\xi_i = \begin{cases} t_i\alpha(p_i)^q, & \text{for non-claim records} \\ t_i\alpha(p_i)^q - q\log(p_i) + \log\!\left(\dfrac{\sigma_{log}}{\alpha}\right) & \\ + \dfrac{\dfrac{1}{k}\sum_{i=1}^{k}(\log(s_i) - (1-q)\log(p_i) - \gamma)^2}{2\sigma_{log}^2}, & \text{for open claim records} \\ t_i\alpha(p_i)^q - q\log(p_i) + \log\!\left(\dfrac{\sigma_{log}}{\alpha}\right) & \\ + \dfrac{(\log(s_i) - (1-q)\log(p_i) - \gamma)^2}{2\sigma_{log}^2}, & \text{for settled claim records.} \end{cases} \quad (26)$$

It is important to keep in mind that, in the subformula of Equation (26) that pertains to open claim records, only settled claim records in the training data enter into the normalized sum that appears in the numerator of the forth term. As shown below, this numerator is in fact the maximum likelihood estimate of $\sigma_{log}^2$. When the above formula is applied to a separate validation data set after all parameters have been estimated on the training data, the forth term therefore reduces to a constant value of ½.

Maximum likelihood parameter estimates are obtained by choosing parameter values that minimize the sum of Equation (26) over all database records in the training set. If the training data for a segment consists of N database records, the first k of which represent settled claims and the next l represent open claims, then the sum of Equation (26) is given by $$\xi = \alpha\left(\sum_{i=1}^{N} t_i(p_i)^q\right) - q\left(\sum_{i=1}^{k+l} \log(p_i)\right) + (k+l)\log\left(\frac{\sigma_{\log}}{a}\right) + \left(\frac{k+l}{k}\right)\left(\frac{1}{2\sigma_{\log}^2}\right)\sum_{i=1}^{k}(\log(s_i) - (1-q)\log(p_i) - \gamma)^2. \quad (27)$$

Equations for the maximum likelihood estimates of $\alpha$, $\gamma$, and $\sigma_{log}^2$ are readily obtained by setting the corresponding partial derivatives of Equation (27) to zero. The partial derivative of with respect to $\alpha$ is given by $$\frac{\partial \xi}{\partial \alpha} = \left(\sum_{i=1}^{N} t_i(p_i)^q\right) - \frac{k+l}{a}.$$

When set to zero, the above equation yields the following maximum likelihood estimate of $\alpha$:

$$\hat{\alpha} = \frac{k+l}{\sum_{i=1}^{N} t_i(p_i)^q}. \quad (28)$$

Similarly, the partial derivative of $\xi$ with respect to $\gamma$ $$\frac{\partial \xi}{\partial \gamma} = \left(\frac{k+l}{k}\right)\left(\frac{-1}{\sigma_{\log}^2}\right)\sum_{i=1}^{k}\log(s_i) - (1-q)\log(p_i) - \gamma$$

when set to zero yields $$\hat{\gamma} = \frac{1}{k}\sum_{i=1}^{k}\log(s_i) - \frac{(1-q)}{k}\sum_{i=1}^{k}\log(p_i), \quad (29)$$

and the partial derivative of $\xi$ with respect to $\sigma_{log}$ $$\frac{\partial \xi}{\partial \sigma_{\log}} = \frac{k+l}{\sigma_{\log}} - \left(\frac{k+l}{k}\right)\left(\frac{1}{\sigma_{\log}^3}\right)\sum_{i=1}^{k}(\log(s_i) - (1-q)\log(p_i) - \gamma)^2$$

when set to zero yields $$\hat{\sigma}_{\log}^2 = \frac{1}{k}\sum_{i=1}^{k}(\log(s_i) - (1-q)\log(p_i) - \gamma)^2. \quad (30)$$

When combined with Equation (29), Equation (30) reduces to $$\hat{\sigma}_{log}^2 = (1-q)^2\hat{\sigma}_{log(p)}^2 - 2(1-q)\hat{\sigma}_{log(s)log(p)} + \hat{\sigma}_{log(s)}^2, \quad (31)$$

where $$\hat{\sigma}_{\log(p)}^2 = \left[\frac{1}{k}\sum_{i=1}^{k}\log^2(p_i)\right] - \left[\frac{1}{k}\sum_{i=1}^{k}\log(p_i)\right]^2, \quad (32)$$

$$\hat{\sigma}_{\log(s)\log(p)} = \left[\frac{1}{k}\sum_{i=1}^{k}\log(s_i)\log(p_i)\right] - \left[\frac{1}{k}\sum_{i=1}^{k}\log(s_i)\right]\left[\frac{1}{k}\sum_{i=1}^{k}\log(p_i)\right], \quad (33)$$

and $$\hat{\sigma}_{\log(s)}^2 = \left[\frac{1}{k}\sum_{i=1}^{k}\log^2(s_i)\right] - \left[\frac{1}{k}\sum_{i=1}^{k}\log(s_i)\right]^2. \quad (34)$$

Unfortunately, it is not possible to obtain a closed-form solution for the maximum likelihood estimate of q. Instead, Equation (27) must be minimized directly using numerical analysis techniques in order to estimate q. Equations (28)–(31) can be used to eliminate all other parameters from Equation (27). The maximum likelihood estimate of q is then determined by minimizing the resulting equation, which is given below $$\xi = (k+l)\log\left(\sum_{i=1}^{N} t_i(p_i)^q\right) - q\left(\sum_{i=1}^{k+l}\log(p_i)\right) + \left(\frac{k+l}{2}\right)\log[(1-q)^2\hat{\sigma}_{\log(p)}^2 - 2(1-q)\hat{\sigma}_{\log(s)\log(p)} + \hat{\sigma}_{\log(s)}^2] + \frac{3(k+l)}{2} - (k+l)\log(k+l).$$

To minimize the above equation with respect to q, it is useful to note that the fourth and fifth terms are constants and can be dropped from consideration. It is also useful to combine the first two terms and to normalize the equation by dividing through by (k+l). After performing these operations, the resulting equivalent equation to be minimized is $$\xi' = \log\left(\sum_{i=1}^{N} t_i\left(\frac{p_i}{\tilde{p}}\right)^q\right) + \frac{1}{2}\log[(1-q)^2\hat{\sigma}_{\log(p)}^2 - 2(1-q)\hat{\sigma}_{\log(s)\log(p)} + \hat{\sigma}_{\log(s)}^2], \quad (35)$$

where $\tilde{p}$ is the geometric mean of the premiums charged per unit time for claim records only $$\tilde{p} = \left(\prod_{i=1}^{k+l} p_i\right)^{\frac{1}{k+l}} \quad (36)$$

-continued $$= e^{\frac{1}{k+1}\Sigma_{i=1}^{k+l}\log(p_i)}.$$

The first term of Equation (35) corresponds to the frequency component of the negative log-likelihood of the training data, while the second term corresponds to the severity component. Minimizing their sum thus balances the degree of fit of Equation (18) to the observed occurrences of claim filings against the degree of fit of Equation (19) to the claim amounts.

The second term of Equation (35) is the logarithm of a quadratic formula that can be efficiently computed as q is varied once $\hat{\sigma}_{\log(p)}^2$, $\hat{\sigma}_{\log(s)\log(p)}$, and $\hat{\sigma}_{\log(s)}^2$ have been calculated. The second term achieves its minimum value when $$q = 1 - \frac{\hat{\sigma}_{\log(s)\log(p)}}{\hat{\sigma}_{\log(p)}^2}. \quad (37)$$

This value of q is a useful starting point when minimizing Equation (35). Note that if $\hat{\sigma}_{\log(p)}^2 = 0$, then $\hat{\sigma}_{\log(s)\log(p)} = 0$ and the second term of Equation (35) becomes a constant (i.e., $\frac{1}{2}\log(\hat{\sigma}_{\log(s)}^2)$). Under these circumstances, the optimum value of q is dictated solely by the first term of Equation (35).

Unfortunately, the first term in Equation (35) cannot be efficiently computed as q is varied because the relevant data records would have to be rescanned for each new value of q that is considered, and because the number of such data records is typically very large. However, computationally-efficient approximations of the first term can be constructed and substituted into Equation (35) for the purpose of estimating q. Moreover, these approximations can be made as accurate as desired.

The first term in Equation (35) turns out to be very well behaved. Its value is bounded above and below by linear functions of q. In particular, let $f(q)$ be the value of the first term $$f(q) = \log\left(\sum_{i=1}^{N} t_i \left(\frac{p_i}{\tilde{p}}\right)^q\right), \quad (38)$$

and let $p_{min}$ and $p_{max}$ be the minimum and maximum values, respectively, of $p_i$, $1 \leq i \leq N$. Then for $q \geq 0$, $$q\log\left(\frac{p_{min}}{\tilde{p}}\right) + \log\left(\sum_{i=1}^{N} t_i\right) \leq f(q) \leq q\log\left(\frac{p_{max}}{\tilde{p}}\right) + \log\left(\sum_{i=1}^{N} t_i\right),$$

and for q<0, $$q\log\left(\frac{p_{max}}{\tilde{p}}\right) + \log\left(\sum_{i=1}^{N} t_i\right) \leq f(q) \leq q\log\left(\frac{p_{min}}{\tilde{p}}\right) + \log\left(\sum_{i=1}^{N} t_i\right).$$

Note that, if $p_{min} = p_{max}$, that is if all policyholders in a segment are charged the same premium per unit time, then $f(q)$ becomes a constant $$f(q) = \log\left(\sum_{i=1}^{N} t_i\right).$$

The choice of q is then arbitrary. In this case, q is a redundant parameter because all policyholders will be assigned the same frequency and mean severity by Equations (18) and (19). Segmenting on the basis of loss ratio becomes equivalent to segmenting on the basis of pure premium under these circumstances.

In general, $p_{min}$ will be strictly less than $p_{max}$. In this case, $f(q)$ is not only bounded by linear function of q, it asymptotically converges to linear functions of q as the magnitude of q tends to infinity. For $q \geq 0$, the asymptotic behavior of $f(q)$ is revealed by rewriting Equation (38) in the form $$f(q) = q\log\left(\frac{p_{max}}{\tilde{p}}\right) + \log\left(\sum_{\substack{i \\ p_i = p_{max}}} t_i\right) + \log\left(1 + \frac{\sum_{\substack{i \\ p_i \neq p_{max}}} t_i \left(\frac{p_i}{p_{max}}\right)^q}{\sum_{\substack{i \\ p_i = p_{max}}} t_i}\right) \quad (39)$$

$$= q\log\left(\frac{p_{max}}{\tilde{p}}\right) + \log\left(\sum_{\substack{i \\ p_i = p_{max}}} t_i\right) + \log(1 + e^{g(q)}),$$

where $$g(q) = \log\left(\frac{\sum_{\substack{i \\ p_i \neq p_{max}}} t_i (p_i)^q}{\sum_{\substack{i \\ p_i = p_{max}}} t_i (p_{max})^q}\right). \quad (40)$$

Note that g(q) is a monotonically decreasing function that tends to negative infinity in the limit as q tends to infinity. Thus, the linear and constant terms of Equation (39) dominate for q>>0.

For q<0, the asymptotic behavior is revealed by rewriting Equation (38) in the form $$f(q) = q\log\left(\frac{p_{min}}{\tilde{p}}\right) + \log\left(\sum_{\substack{i \\ p_i = p_{min}}} t_i\right) + \log\left(1 + \frac{\sum_{\substack{i \\ p_i \neq p_{min}}} t_i \left(\frac{p_i}{p_{min}}\right)^q}{\sum_{\substack{i \\ p_i = p_{min}}} t_i}\right) \quad (41)$$

-continued $$= q\log\left(\frac{p_{min}}{\tilde{p}}\right) + \log\left(\sum_{\substack{i \\ p_i = p_{min}}} t_i\right) + \log(1 + e^{h(q)}),$$

where $$h(q) = \log\left(\frac{\sum_{\substack{i \\ p_i \neq p_{min}}} t_i(p_i)^q}{\sum_{\substack{i \\ p_i = p_{min}}} t_i(p_{min})^q}\right). \quad (42)$$

In this case, h(q) is a monotonically increasing function that tends to negative infinity as q tends to negative infinity. Thus, the linear and constant terms of Equation (41) dominate for q<<0.

The above equations enable approximations of $f(q)$ to be constructed in terms of approximations for g(q) and h(q). The accuracy of these approximations depend on what constraints can be assumed for the value of q. If policyholders are being charged premiums that accurately reflect their true levels of risk, then the value of q should be close to one because frequency is highly correlated with pure premium. However, the value of q becomes less predictable if significant risk factors exist that are not accounted for in pricing. For segments that are not being priced according to actual risk, one could easily imagine negative values of q (i.e., the higher the premium, the lower the frequency), and values of q that are greater than one (i.e., the lower the premium, the higher the severity).

Nevertheless, it is reasonable to assume that q will typically lie within some interval $a \leq q \leq b$, where a<0<b. Approximations for g(q) and h(q) can then be constructed that are highly accurate within this interval, but are less accurate when q falls outside the interval. The upper and lower bounds of the interval can be determined experimentally by performing data mining runs assuming default values for the bounds. If the value of q for any of the resulting segments is found to lie outside the default interval, then the upper and lower bounds of the interval can be adjusted and data mining re-executed. This process can be repeated as many times as necessary to obtain appropriate bounds for q. Note, however, that the bounds should be made as tight as possible in order to maximize the accuracy of the approximating functions for g(q) and h(q).

For values of q in the interval $a \leq q \leq b$, where a<0<b, accurate polynomial approximations of g(q) and h(q) can be constructed using Chebyshev interpolation. With this approach, the true value of g(q) would be calculated for (m+1) discrete values of q, labeled $q_0, \ldots, q_m$, where $q_i$ is given by $$q_i = \frac{b\left(\cos\left(\frac{\pi}{2m+2}\right) - \cos\left(\frac{(2i+1)\pi}{2m+2}\right)\right)}{2\cos\left(\frac{\pi}{2m+2}\right)} \quad (43)$$

-continued $$= b\sec\left(\frac{\pi}{2m+2}\right)\sin\left(\frac{i\pi}{2m+2}\right)\sin\left(\frac{(i-1)\pi}{2n+2}\right).$$

Note that $q_0=0$ and $q_m=b$. Similarly, the true value of h(q) would be calculated for (n+1) discrete values of q, labeled $q_{-n}, \ldots, q_0$, where $q_i$ is given by $$q_i = \frac{a\left(\cos\left(\frac{\pi}{2n+2}\right) - \cos\left(\frac{(1-2i)\pi}{2n+2}\right)\right)}{2\cos\left(\frac{\pi}{2n+2}\right)} \quad (44)$$

$$= a\sec\left(\frac{\pi}{2n+2}\right)\sin\left(\frac{i\pi}{2n+2}\right)\sin\left(\frac{(i-1)\pi}{2n+2}\right).$$

Note that $q_{-n}=\alpha$ and that Equations (43) and (44) agree on the value of $q_0$ (i.e., $q_0=0$). The polynomial approximations of g(q) and h(q) for $\alpha \leq q \leq b$ are then given by $$\hat{g}(q) = \sum_{i=0}^{m} g(q_i) \left(\frac{\prod_{\substack{j=0 \\ j \neq i}}^{m} (q - q_j)}{\prod_{\substack{j=0 \\ j \neq i}}^{m} (q_i - q_j)}\right) \quad (45)$$

and $$\hat{h}(q) = \sum_{i=-n}^{0} h(q_i) \left(\frac{\prod_{\substack{j=-n \\ j \neq i}}^{0} (q - q_j)}{\prod_{\substack{j=-n \\ j \neq i}}^{0} (q_i - q_j)}\right). \quad (46)$$

The above equations have a number of important properties. The first is that the values of $q_i$ defined by Equations (43) and (44) correspond to the roots of Chebyshev polynomials of orders (m+1) and (n+1), respectively. For $m,n \leq 20$, the approximation errors of Equations (45) and (46) are no worse than four times the approximation errors of optimal polynomials of degrees m and n (see, for example, G. Dahlquist, A. Bjorck, and N. Anderson, *Numerical Methods*. Englewood Cliffs, N.J.: Prentice-Hall, 1974). For $m,n \leq 100$, the approximation errors are no worse than five times those of optimal polynomials. Equidistant values of $q_i$, on the other hand, could result in extremely large approximation errors, especially at the extreme ends of the interval $\alpha \leq q \leq b$. Another property of the above equations is that Equations (45) and (46) are very stable from a numerical analysis standpoint even for extremely high-order polynomials. "Simplifying" these equations by expanding them into standard polynomial forms could potentially lead to numerically unstable calculations. Thus, the approximating functions defined by Equations (43)–(46) are very robust from both mathematical and computational standpoints.

For computational reasons, it is desirable to keep the values of m and n as small as possible. Appropriate values can be determined experimentally by observing the effect that different settings of m and n have on the segmentations that are produced. As m and n are increased, the approximating functions $\hat{g}(q)$ and $\hat{h}(q)$ will likewise increase in accuracy. However, a point will be reached beyond which further increases in accuracy will not affect the resulting segmentation. The corresponding values of m and n are therefore the most appropriate ones to use, since further increases would yield no additional benefit.

Although accurate approximations of g(q) and h(q) are desired for $\alpha \leq q \leq b$, it is still necessary to develop reasonable approximations for the case in which q falls outside this interval. Suitable approximations can be obtained by noting that Equations (40) and (42) are similar in form to Equation (38); hence, g(q) and h(q) are likewise asymptotically linear in q. Let $p_{max2}$ be the second largest value of $p_i$, $1 \leq i \leq N$. Then Equation (40) can be rewritten as $$g(q) = q\log\left(\frac{p_{max2}}{p_{max}}\right) + \log\left(\frac{\sum_{\substack{i \\ p_i = p_{max2}}} t_i}{\sum_{\substack{i \\ p_i = p_{max}}} t_i}\right) + \log\left(1 + \frac{\sum_{\substack{i \\ p_i < p_{max2}}} t_i(p_i)^q}{\sum_{\substack{i \\ p_i = p_{max2}}} t_i(p_{max2})^q}\right).$$

The third term in the above equation tends to zero exponentially fast as q tends to infinity. The sums that appear in this term can be approximated with a simple exponential function to obtain the following rough approximation of g(q) for q>b $$\hat{g}(q) = q\log\left(\frac{p_{max2}}{p_{max}}\right) + \log\left(\frac{\sum_{\substack{i \\ p_i = p_{max2}}} t_i}{\sum_{\substack{i \\ p_i = p_{max}}} t_i}\right) + \qquad (47)$$

$$\log\left(1 + \frac{\sum_{\substack{i \\ p_i < p_{max2}}} t_i(p_i)^{q_m}}{\sum_{\substack{i \\ p_i = p_{max2}}} t_i(p_{max2})^{q_m}} \cdot e^{\varphi(q-q_m)}\right),$$

where $q_m = b$ as per Equation (43), and where $$\varphi = \frac{\sum_{\substack{i \\ p_i < p_{max2}}} t_i(p_i)^{q_m}\log(p_i)}{\sum_{\substack{i \\ p_i < p_{max2}}} t_i(p_i)^{q_m}} - \log(p_{max2}). \qquad (48)$$

The value of $\varphi$ in the above equation was selected so that not only are the values of g(q) and $\hat{g}(q)$ the same for $q = q_m$, but their first derivatives are the same as well.

To approximate h(q) for $q < \alpha$, let $p_{min2}$ be the second smallest value of $p_i$, $1 \leq i \leq N$. Then Equation (42) can be rewritten as $$h(q) = q\log\left(\frac{p_{min2}}{p_{min}}\right) + \log\left(\frac{\sum_{\substack{i \\ p_i = p_{min2}}} t_i}{\sum_{\substack{i \\ p_i = p_{min}}} t_i}\right) + \log\left(1 + \frac{\sum_{\substack{i \\ p_i > p_{min2}}} t_i(p_i)^q}{\sum_{\substack{i \\ p_i = p_{min2}}} t_i(p_{min2})^q}\right).$$

The third term in the above equation also tends to zero exponentially fast as q tends to infinity. It can likewise be approximated using a simple exponential function to obtain the following approximation of h(q) for $q < \alpha$ $$\hat{h}(q) = q\log\left(\frac{p_{min2}}{p_{min}}\right) + \log\left(\frac{\sum_{\substack{i \\ p_i = p_{min2}}} t_i}{\sum_{\substack{i \\ p_i = p_{min}}} t_i}\right) + \qquad (49)$$

$$\log\left(1 + \frac{\sum_{\substack{i \\ p_i > p_{min2}}} t_i(p_i)^{q-n}}{\sum_{\substack{i \\ p_i = p_{min2}}} t_i(p_{min2})^{q-n}} \cdot e^{\psi(q-q_{-n})}\right),$$

where $q_{-n} = \alpha$ as per Equation (44), and where $$\psi = \frac{\sum_{\substack{i \\ p_i > p_{min2}}} t_i(p_i)^{q-n}\log(p_i)}{\sum_{\substack{i \\ p_i > p_{min2}}} t_i(p_i)^{q-n}} - \log(p_{min2}). \qquad (50)$$

When combined, Equations (39)–(50) yield the following approximation to Equation (35):

$$\hat{\xi}' = \hat{f}(q) + \frac{1}{2}\log[(1-q)^2\hat{\sigma}_{log(p)}^2 - 2(1-q)\hat{\sigma}_{log(s)log(p)} + \hat{\sigma}_{log(s)}^2], \qquad (51)$$

where $$\hat{f}(q) = \begin{cases} q\log\left(\frac{p_{max}}{\bar{p}}\right) + \log\left(\sum_{\substack{i \\ p_i = p_{max}}} t_i\right) + \log(1 + e^{\hat{g}(q)}), & \text{for } q \geq 0 \\ q\log\left(\frac{p_{min}}{\bar{p}}\right) + \log\left(\sum_{\substack{i \\ p_i = p_{min}}} t_i\right) + \log(1 + e^{\hat{h}(q)}), & \text{for } q < 0. \end{cases} \qquad (52)$$

In the above equation, $\hat{g}(q)$ is given by Equations (45) and (47) for $0 \leq q \leq q_m$ and $q > q_m$, respectively; $\hat{h}(q)$ is given by Equations (46) and (49) for $q_{-n} \leq q < 0$ and $q < q_{-n}$, respectively.

The optimum value of q is estimated by minimizing Equation (51) with respect to q. This minimization can be readily accomplished using standard function-minimization techniques (see, for example, W. H. Press, S. A. Teukolsky, W. T. Vetterling, and B. P. Flannery, *Numerical Recipes in C, The Art of Scientific Computing, Second Edition*. New York: Cambridge University Press, 1992). Values for $\sigma_{log}^2$, $\gamma$ and $\beta$ can then be estimated using Equations (31), (29) and (24), respectively. The value of $\alpha$ can be estimated by expressing the denominator of Equation (28) in terms of $f(q)$ as defined in Equation (38), and then using $\hat{f}(q)$ given above to estimate $f(q)$. The resulting estimate of $\alpha$ is given by $$\hat{\alpha} = \frac{k+1}{e^{\hat{f}(q) + q\log(\bar{p})}}. \tag{53}$$

The estimated loss ratio is then $\hat{L} = \hat{\alpha} \cdot \hat{\beta}$.

To identify splitting factors, Equation (51) is summed over all segments to yield the overall score of the loss-ratio model on the training data. This score is then minimized in a stepwise fashion, where each step involves dividing a larger group of policyholders into two or more smaller groups so as to reduce the value of the overall score to the maximum extent possible. To ensure actuarial credibility, only those subdivisions that satisfy Equation (15) are considered during this top-down process.

Note that calculation of Equation (51) requires computing the sums defined in Equations (32)–(34) and (36), as well as computing several sums of the forms $$\sum_{i \in \Phi} t_i, \quad \sum_{i \in \Phi} t_i(p_i)^q, \quad \text{and} \quad \sum_{i \in \Phi} t_i(p_i)^q \log(p_i)$$

for various subsets of data records $\Phi$ and various fixed values of q. These sums can be computed in a single pass over the data for each new splitting factor. Moreover, the sums obtained from disjoint subsets of data can be efficiently combined in the process of evaluating alternate splitting factors, in much the same way that similar sums are combined in standard tree-based modeling algorithms.

The validation-set technique presented earlier is also applied for the purpose of maximizing the predictive accuracy of the resulting loss-ratio model. However, instead of using Equation (51) to calculate the overall model score on the validation data, Equation (26) must be used instead. Equation (51) was derived for the purpose of estimating model parameters during training and it does not apply when evaluating loss-ratio models on separate data sets with the parameters held fixed.

Equation (26) can be simplified for validation purposes by exploiting the fact that only settled claim records in the training data enter into the sum in the subformula of Equation (26) that pertains to open claim records. From Equation (30), that subformula simplifies to $$t_i a(p_i)^q - q\log(p_i) + \log\left(\frac{\sigma \log}{a}\right) + \frac{1}{2}.$$

Dropping the constant term and substituting the resulting formula back into Equation (26) thus yields the following equation for the negative log-likelihood with constant terms removed for database records i in the validation data set:

$$\xi_i = \begin{cases} t_i a(p_i)^q, & \text{for non-claim records} \\ t_i a(p_i)^q - q\log(p_i) + \log\left(\frac{\sigma_{\log}}{a}\right) & \text{for open claim records} \\ t_i a(p_i)^q - q\log(p_i) + \log\left(\frac{\sigma_{\log}}{a}\right) & \\ + \frac{(\log(s_i) - (1-q)\log(p_i) - \gamma)^2}{2\sigma_{\log}^2}, & \text{for settled claim records.} \end{cases} \tag{54}$$

If the validation data for a segment consists of N database records, the first k of which represent settled claims and the next l represent open claims, then the sum of Equation (54) over these records is given by $$\xi = a\left(\sum_{i=1}^{N} t_i(p_i)^q\right) - q\left(\sum_{i=1}^{k+l} \log(p_i)\right) + (k+l)\log\left(\frac{\sigma_{\log}}{a}\right) + \left(\frac{1}{2\sigma_{\log}^2}\right)\sum_{i=1}^{k} (\log(s_i) - (1-q)\log(p_i) - \gamma)^2. \tag{55}$$

The sum of Equation (55) over all segments is used as the overall score of the loss-ratio model on the validation data. The most predictive segmentation is determined by minimizing this overall score.

Although the loss-ratio model presented above assumes a Poisson/log-normal model for the claims process, it should be pointed out that the same modeling methodology can be applied to develop loss-ratio models for other families of statistical models employed by actuaries, such as those described by Klugman et al. (see above).

In addition to using actuarial constraints in conjunction with insurance risk models, the present invention can be practiced in combination with statistical constraints developed for use with other kinds of statistical models, such as weighted least-squares models of the kind found in prior art regression tree methods such as CART (see L. Breiman et al. above) and SPSS's implementation of CHAID (see, for example, http://www.SPSS.com). As previously discussed, weighted least-squares techniques can be used to develop models for predicting pure premium and loss ratio by making use of the fact that the pure premium and loss ratio of a risk group can be expressed as weighted averages of the pure premiums and loss ratios, respectively, of the individual data records that belong to the risk group. Even though least-squares models are not well-suited to the statistical characteristics of insurance data, such models have the benefit of being extremely simple and, therefore, widely applicable. It is quite reasonable from a modeling standpoint to use such models for exploratory purposes before investing time and effort in developing more elaborate models that are tailored to the specific statistical characteristics of the data. However, prior art regression tree methods are still deficient in that they do not take actuarial credibility into account. The present invention, on the other hand, enables weighted least-squares models to be combined with actuarial credibility constraints, thereby yielding a more suitable modeling technique from an actuarial point of view.

The individual pure premium of database record i is defined to be $$\text{Pure Premium}_i = \begin{cases} 0, & \text{for non-claim records} \\ \dfrac{s_i}{t_i}, & \text{for settled claim records,} \end{cases}$$

where $s_i$ is the claim amount associated with the i'th record and $t_i$ is the earned exposure of the record. Similarly, the individual loss ratio of database record i is defined to be $$\text{Loss Ratio}_i = \begin{cases} 0, & \text{for non-claim records} \\ \dfrac{s_i}{p_i \cdot t_i}, & \text{for settled claim records,} \end{cases}$$

where $s_i$ and $t_i$ are defined as above, and where $p_i$ is the premium charged per unit time. The product $p_i \cdot t_i$ is thus the earned premium of record i. Individual loss ratios are undefined for open claim records.

If there were no open claim records, the estimated pure premium for a group of policyholders would be given by $$\text{Pure Premium} = \frac{\sum_{i=1}^{N}(t_i)(\text{Pure Premium}_i)}{\sum_{i=1}^{N} t_i} = \frac{\sum_{i=1}^{k} s_i}{\sum_{i=1}^{N} t_i},$$

where N is the number of database records for the group, the first k of which are assumed for convenience to be claim records. Likewise, the estimated loss ratio for a group of policyholders would be given by $$\text{Loss Ratio} = \frac{\sum_{i=1}^{N}(p_i \cdot t_i)(\text{Loss Ratio}_i)}{\sum_{i=1}^{N} p_i \cdot t_i} = \frac{\sum_{i=1}^{k} s_i}{\sum_{i=1}^{N} p_i \cdot t_i}.$$

Note that the above equations have the general form $$\overline{X} = \frac{\sum_{i=1}^{N} w_i \cdot X_i}{\sum_{i=1}^{N} w_i} = \frac{\sum_{i=1}^{k} s_i}{\sum_{i=1}^{N} w_i}, \tag{56}$$

where $$X_i = \begin{cases} 0, & \text{for non-claim records} \\ \dfrac{s_i}{w_i}, & \text{for settled claim records,} \end{cases} \tag{57}$$

and where $w_i = t_i$ in the case of pure premium, and $w_i = p_i \cdot t_i$ in the case of loss ratio. Thus, a single statistical model can be developed based on Equations (56) and (57) that can then be specialized for pure premium or loss ratio modeling by supplying appropriate values for the weights $w_i$.

Let us assume for the moment that Equation (56) is obtained by minimizing an optimization criterion $\xi$. Equation (56) would then be obtained by differentiating $\xi$ with respect to the weighted average $\overline{X}$ and setting the result to zero. Rearranging Equation (56) leads to the following differential equation for the value of $\overline{X}$ that optimizes $\xi$ $$\frac{\partial \xi}{\partial \overline{X}} = C_1 \cdot \left[ \overline{X}\left(\sum_{i=1}^{N} w_i\right) - \sum_{i=1}^{N} w_i \cdot X_i \right] = 0,$$

where $C_1$ can be any nonzero term that is not a function of the weighted average $\overline{X}$. The optimization criterion $\xi$ can be recovered by integrating the above equation with respect to $\overline{X}$:

$$\begin{aligned}\xi &= C_1 \int \left[ \overline{X}\left(\sum_{i=1}^{N} w_i\right) - \sum_{i=1}^{N} w_i \cdot X_i \right] d\overline{X} \\ &= C_1 \cdot \left[ \frac{1}{2}\overline{X}^2\left(\sum_{i=1}^{N} w_i\right) - \overline{X}\left(\sum_{i=1}^{N} w_i \cdot X_i\right) \right] + C_2 \\ &= \frac{C_1}{2}\left(\sum_{i=1}^{N} w_i \cdot (X_i - \overline{X})^2\right) + C_3,\end{aligned}$$

where $C_2$ and $C_3$ are constants of integration, $C_3 = C_2 - \frac{1}{2}\sum_{i=1}^{N} w_i \cdot X_i^2$.

From a maximum likelihood standpoint, the optimization criterion derived above can be viewed as the negative log likelihood of the data values $X_i$'s under the assumption that the $X_i$'s follow a weighted Gaussian distribution $f(X_i)$ given by $$f(X_i) = \sqrt{\frac{w_i}{2\pi\sigma^2}} \cdot e^{-\frac{w_i \cdot (X_i - \overline{X})^2}{2\sigma^2}}. \tag{58}$$

The variance of each data value $X_i$ is thus $$\text{Var}[X_i] = \frac{\sigma^2}{w_i}, \tag{59}$$

and the negative log likelihood of $X_i$ is $$-\log f(X_i) = \frac{1}{2}\log\left(\frac{2\pi\sigma^2}{w_i}\right) + \frac{w_i \cdot (X_i - \overline{X})^2}{2\sigma^2}.$$

Summing the above equation and setting the result equal to $\xi$ reveals that $$C_1 = \frac{1}{\sigma^2} \text{ and } C_3 = \frac{1}{2}\sum_{i=1}^{N}\log\left(\frac{2\pi\sigma^2}{w_i}\right),$$

and that $$\xi = -\sum_{i=1}^{N}\log f(X_i) \qquad (60)$$

$$= \frac{1}{2\sigma^2}\sum_{i=1}^{N} w_i \cdot (X_i - \overline{X})^2 + \frac{1}{2}\sum_{i=1}^{N}\log\left(\frac{2\pi\sigma^2}{w_i}\right).$$

The above equation for the negative log likelihood criterion $\xi$ can be generalized to take open claim records into account by noticing that each data record effectively contributes an amount $$w_i \cdot (X_i - \overline{X})^2$$

to the first term of Equation (60). For nonclaim records, the above formula reduces to $$w_i \overline{X}^2.$$

In the case of settled claim records, the formula expands to $$w_i \cdot \overline{X}^2 + s_i\left(\frac{s_i}{w_i} - 2\overline{X}\right).$$

For open claims, the value of $s_i$ is unknown. However, the above formula for settled claim records can be used for open claim records by approximating the second term of the formula by its average value with respect to the settled claim records:

$$w_i \cdot \overline{X}^2 + \frac{1}{k}\sum_{i=1}^{k} s_i\left(\frac{s_i}{w_i} - 2\overline{X}\right).$$

The three formulas above enable the negative log likelihood of record i to be defined as follows:

(61)
$$\xi_i = \begin{cases} \frac{1}{2\sigma^2}(w_i \cdot \overline{X}^2) + \frac{1}{2}\log\left(\frac{2\pi\sigma^2}{w_i}\right), & \text{for non-claim records} \\ \frac{1}{2\sigma^2}\left[w_i \cdot \overline{X}^2 + \frac{1}{k}\sum_{i=1}^{k} s_i\left(\frac{s_i}{w_i} - 2\overline{X}\right)\right] + \frac{1}{2}\log\left(\frac{2\pi\sigma^2}{w_i}\right), & \text{for open records} \\ \frac{1}{2\sigma^2}\left[w_i \cdot \overline{X}^2 + s_i\left(\frac{s_i}{w_i} - 2\overline{X}\right)\right] + \frac{1}{2}\log\left(\frac{2\pi\sigma^2}{w_i}\right), & \text{for settled claim records.} \end{cases}$$

If the data for a risk group consists of N database records, the first k of which represent settled claims and the next l represent open claims, then the negative log likelihood of the data is given by the sum of Equation (61) for those data records:

$$\xi = \frac{1}{2\sigma^2}\left[\sum_{i=1}^{N} w_i \cdot \overline{X}^2 + \frac{l}{k}\sum_{i=1}^{k} s_i\left(\frac{s_i}{w_i} - 2\overline{X}\right) + \sum_{i=1}^{k} s_i\left(\frac{s_i}{w_i} - 2\overline{X}\right)\right] + \qquad (62)$$

$$\frac{1}{2}\sum_{i=1}^{N}\log\left(\frac{2\pi\sigma^2}{w_i}\right)$$

$$= \frac{1}{2\sigma^2}\left[\overline{X}^2\sum_{i=1}^{N} w_i + \frac{k+l}{k}\sum_{i=1}^{k} s_i\left(\frac{s_i}{w_i} - 2\overline{X}\right)\right] + \frac{1}{2}\sum_{i=1}^{N}\log\left(\frac{2\pi\sigma^2}{w_i}\right).$$

Note that Equation (62) reduces to Equation (60) in the case where there are no open claims records (i.e., l=0).

The maximum likelihood estimate of the weighted average $\overline{X}$ for the group is determined by setting the corresponding derivative of the above equation to zero. The derivative of $\xi$ with respect to $\overline{X}$ is $$\frac{\partial \xi}{\partial \overline{X}} = \frac{1}{\sigma^2}\left[\overline{X}\sum_{i=1}^{N} w_i - \frac{k+l}{k}\sum_{i=1}^{k} s_i\right],$$

which, when set to zero yields the following maximum likelihood estimate of $\overline{X}$:

$$\overline{X} = \frac{\frac{k+l}{k}\sum_{i=1}^{k} s_i}{\sum_{i=1}^{N} w_i}. \tag{63}$$

Comparing Equation (63) to Equation (56) reveals that, when open claim records are present, the sum of the settled claim amounts must be scaled proportionately in order to estimate the sum of all claim amounts when calculating the weighted average $\overline{X}$.

Actuarial credibility can be enforced by placing a limit on the fractional standard error allowed in the above estimate of the weighted average $\overline{X}$. The variance of $\overline{X}$ can be calculated by first noticing that Equation (63), as obtained from Equation (62), is actually a simplified version of the equation $$\overline{X} = \frac{\frac{k+l}{k}\left(\sum_{i=1}^{k} w_i \cdot X_i + \sum_{i=k+l+1}^{N} w_i \cdot X_i\right)}{\sum_{i=1}^{N} w_i},$$

where $X_i=0$ for $i>k+l$, and where the numerator omits $X_i$'s for open claims records, whose indices lie in the range $k+1 \leq i \leq k+l$ as per Equation (62). The variance of the weighted average $\overline{X}$ is therefore given by $$\text{Var}[\overline{X}] = \left(\frac{\frac{k+l}{k}}{\sum_{i=1}^{N} w_i}\right)^2 \left(\sum_{i=1}^{k} w_i^2 \cdot \text{Var}[X_i] + \sum_{i=k+l+1}^{N} w_i^2 \cdot \text{Var}[X_i]\right),$$

which, from Equation (59) simplifies to $$\text{Var}[\overline{X}] = \sigma^2 \cdot \left(\frac{k+l}{k}\right)^2 \cdot \frac{\sum_{i=1}^{k} w_i + \sum_{i=k+l+1}^{N} w_i}{\left(\sum_{i=1}^{N} w_i\right)^2}.$$

The fractional standard error of the weighted average $\overline{X}$ is therefore given by $$\frac{\sqrt{Var[\overline{X}]}}{\overline{X}} = \frac{\sqrt{\sigma^2 \cdot \left(\sum_{i=1}^{k} w_i + \sum_{i=k+l+1}^{N} w_i\right)}}{\sum_{i=1}^{k} s_i}.$$

The above equation is expressed in terms of the unweighted variance $\sigma^2$. The maximum likelihood estimate of this unweighted variance can be determined by setting the corresponding derivative of Equation (62) to zero. The derivative of $\xi$ with respect to $\sigma$ is $$\frac{\partial \xi}{\partial \sigma} = \frac{-1}{\sigma^3}\left[\overline{X}^2 \sum_{i=1}^{N} w_i + \frac{k+l}{k}\sum_{i=1}^{k} s_i\left(\frac{s_i}{w_i} - 2\overline{X}\right)\right] + \frac{N}{\sigma},$$

which, when set to zero yields the following maximum likelihood estimate of $\sigma^2$:

$$\sigma^2 = \frac{1}{N}\left[\overline{X}^2 \sum_{i=1}^{N} w_i + \frac{k+l}{k}\sum_{i=1}^{k} s_i\left(\frac{s_i}{w_i} - 2\overline{X}\right)\right]$$

$$= \frac{1}{N} \cdot \left(\frac{k+l}{k}\sum_{i=1}^{k}\frac{s_i^2}{w_i} - \overline{X}^2 \sum_{i=1}^{N} w_i\right).$$

The fractional standard error of $\overline{X}$ therefore reduces to $$\frac{\sqrt{Var[\overline{X}]}}{\overline{X}} = \frac{1}{\sqrt{N}} \cdot \frac{\sqrt{\left(\frac{k+l}{k}\sum_{i=1}^{k}\frac{s_i^2}{w_i} - \overline{X}^2\sum_{i=1}^{N} w_i\right) \cdot \left(\sum_{i=1}^{k} w_i + \sum_{i=k+l+1}^{N} w_i\right)}}{\sum_{i=1}^{k} s_i}$$

Using the above equation, a limit r' can be placed on the maximum allowed fractional standard error of the weighted average $\overline{X}$ in order to constrain the splitting factors that are identified during model construction.

$$\frac{\sqrt{Var[\overline{X}]}}{\overline{X}} = \tag{64}$$

$$\frac{1}{\sqrt{N}} \cdot \frac{\sqrt{\left(\frac{k+l}{k}\sum_{i=1}^{k}\frac{s_i^2}{w_i} - \overline{X}^2\sum_{i=1}^{N} w_i\right) \cdot \left(\sum_{i=1}^{k} w_i + \sum_{i=k+l+1}^{N} w_i\right)}}{\sum_{i=1}^{k} s_i} \leq r'.$$

This limit would thus serve the same role as the actuarial credibility constraint for joint Poisson/log-normal models presented in Equation (15).

It is possible to use the minimum value of Equation (62) as the numerical criterion for selecting splitting factors. However, Equation (62) assumes that the $X_i$'s follow the weighted Gaussian distribution defined by Equation (58) and this assumption is certainly incorrect for the pure premiums and loss ratios of individual data records defined by Equation (57). A more robust criterion would therefore be desirable. Equation (62) can be made more robust by assuming, for the purpose of selecting splitting factors, that the unweighted variance $\sigma^2$ that appears in Equations (61) and (62) is constant across all segments that are constructed. Although this assumption is also likely to be invalid, the assumption has the desirable effect of causing segments to be merged based on similarities in their weighted averages $\overline{X}$. Without the assumption, the preferred merging process may avoid merging segments based on differences in the unweighted variances $\sigma^2$ of the segments even though the weighted averages $\overline{X}$ of the segments may be close in value or even identical.

The above assumption allows Equations (61) and (62) to be rescaled by a constant factor of $2\sigma^2$. In addition, the $\log(2\pi\sigma^2/w_i)$ terms that appear in Equations (61) and (62) become constants when summed over all data records. These terms can therefore be dropped for optimization purposed. Equations (61) can therefore be simplified to yield the following rescaled the negative log likelihood of record i with constant terms removed:

$$\xi_i = \begin{cases} w_i \cdot \overline{X}^2, & \text{for non-claim records} \\ w_i \cdot \overline{X}^2 + \frac{1}{k}\sum_{i=1}^{k} s_i\left(\frac{s_i}{w_i} - 2\overline{X}\right), & \text{for open records} \\ w_i \cdot \overline{X}^2 + s_i\left(\frac{s_i}{w_i} - 2\overline{X}\right), & \text{for settled claim records.} \end{cases} \quad (65)$$

Summing Equation (65) over all data records for a risk group yields the following rescaled negative log likelihood with constant terms removed:

$$\xi = \overline{X}^2 \sum_{i=1}^{N} w_i + \frac{k+l}{k}\sum_{i=1}^{k} s_i\left(\frac{s_i}{w_i} - 2\overline{X}\right) \quad (66)$$

$$= \frac{k+l}{k}\sum_{i=1}^{k} \frac{s_i^2}{w_i} - \overline{X}^2 \sum_{i=1}^{N} w_i.$$

The minimum value of Equation (66) is the preferred numerical criterion for selecting splitting factors when weighted least-squared models are used for insurance risk modeling purposes.

The preferred method steps of the overall invention are now disclosed. A preferred embodiment of the present invention includes features implemented as software tangibly embodied on a computer program product or program storage device for execution on a processor. For example, software implemented in a popular object-oriented computer executable code such as JAVA provides portability across different platforms. Those skilled in the art will appreciate that other procedure-oriented and object-oriented programming (OOP) environments, such as C++ and Smalltalk, can also be employed. Those skilled in the art will also appreciate that the methods of the present invention may be implemented as software for execution on a computer or other processor-based device. The software may be embodied on a magnetic, electrical, optical, or other persistent program and/or data storage device, including but not limited to: magnetic disks, DASD, bubble memory, tape, optical disks such as CD-ROM's and DVD's, and other persistent (also called nonvolatile) storage devices such as core, ROM, PROM, flash memory, or battery backed RAM. Those skilled in the art will also appreciate that within the spirit and scope of the present invention, one or more of the components could be accessed and maintained directly via disk, a network, a server, or could be distributed across a plurality of servers.

Step 1 preferably comprises constructing an initial plurality of population segments and associated segment models. This initial plurality constitutes the initial value of what we will refer to as the "current plurality." Unless prior knowledge about the application domain suggests otherwise, the initial plurality should preferably comprise a single segment model associated with the overall population of training data.

Step 2 preferably comprises selecting a population segment and its associated segment model from the current plurality, excluding those segments and segment models that were selected in previous applications of step 2.

Step 3 preferably comprises replacing the segment and segment model selected in step 2 with two or more smaller segments and associated segment models preferably constructed from the selected segment according to the following method:

a) For each explanatory data field (i.e., data fields whose values are allowed to be used to distinguish one population segment from another), the selected segment should preferably be divided into at least two smaller, mutually exclusive segments based on the possible values of that explanatory data field. If subdivision is not possible, go to step 4.

In the case of a categorical data field, each of the smaller segments should preferably correspond to one of the category values admitted under the definition of the selected segment. If the data field is not mentioned in the definition of the selected segment, then a smaller segment should preferably be constructed for each possible category value for that data field. If the definition of the selected segment restricts the value of the data field to a subset of category values, then smaller segments should preferably be constructed only for category values in that subset. In both cases, it is possible that some category values may correspond to missing values for the data field.

In the case of a numerical data field, the possible values of the data field should preferably be discretized into ordinal classes as described by Biggs et al. (see above) and segments should preferably be constructed for each of the resulting ordinal classes. Segments should also preferably be constructed for additional "floating" categories (see Kass above) that correspond to missing values for the data field.

In all cases, segment models should preferably be constructed for the constructed segments.

b) For each explanatory data field, those segments constructed for the explanatory data field in step 3a that admit missing values for the explanatory field should preferably be set aside and the following merge steps should preferably be performed on the remaining segments constructed for the explanatory field:

i) For nominal explanatory fields, all remaining segments that have at least one training record species count that lies below the threshold for that species should preferably be merged together and a segment model should preferably be constructed for the newly merged segment. For insurance risk or profitability modeling purposes, a threshold of six fully settled claims records should preferably be used.

ii) For ordinal explanatory fields, if all remaining segments have at least one training record species count that lies below the corresponding threshold referred to in step 3b(i), then all remaining segments should preferably be merged together and a segment model should preferably be constructed for the newly merged segment. Otherwise, pairs of remaining segments that satisfy the following conditions should preferably be repeatedly selected and merged, and segment models should preferably be constructed for the newly merged segments, until the conditions can no longer be satisfied or until a single segment is obtained:
  A) The values of the explanatory field that are admitted by the two segments to be merged should preferably be adjacent with respect to the ordering of the values for that ordinal explanatory field.
  B) At least one training record species count for one of the segments to be merged should preferably lie below the corresponding threshold referred to in step 3b(i), while all training record species counts for the other segment in the pair should preferably lie above the corresponding thresholds.
c) For each explanatory data field, those segments constructed for the explanatory field in step 3a that admit missing values for the explanatory field should preferably be set aside. If two or more segments remain from among those constructed for the explanatory field, then pairs of these remaining segments should preferably be repeatedly selected and merged, and segment models should preferably be constructed for the newly merged segments, so as to optimize the desired numerical criteria for selecting splitting factors subject to the following conditions:
  i) If at least one of the remaining segments does not satisfy the desired statistical constraints for segments, then at least one of the segments in the pair being merged should preferably not satisfy the statistical constraints either.
  For insurance risk or profitability modeling purposes using joint Poisson/log-normal models, the preferred statistical constraint for segments is given by Equation (15).
  For insurance risk or profitability modeling purposes using weighted least-squares models, the preferred statistical constraint for segments is given by Equation (64).
  ii) In the case of ordinal data fields, the values of the explanatory field that are admitted by the two segments being merged should preferably be adjacent with respect to the ordering of the values for that ordinal explanatory field.
  For insurance risk modeling purposes using joint Poisson/log-normal models, the preferred criterion for selecting splitting factors is to minimize the sum of Equation (12) for the resulting segments constructed for the explanatory field.
  For policyholder profitability modeling purposes using joint Poisson/log-normal models, the preferred criterion for selecting splitting factors is to minimize the sum of Equation (51) for the resulting segments constructed for the explanatory field.
  For insurance risk or profitability modeling purposes using weighted least-squares models, the preferred criterion for selecting splitting factors is to minimize the sum of Equation (66) for the resulting segments constructed for the explanatory field.
  The merging process described above should preferably be continued until only two segments remain (i.e., not including the segments that were preferably set aside that admit missing values for the field). If one of these two remaining segments does not satisfy the desired statistical constraints for segments, then the two remaining segments should preferably be merged into a single segment.
d) For each explanatory data field, those segments constructed for the explanatory field in step 3a that admit missing values for the explanatory field should preferably be set aside. If a single segment remains from among those constructed for the explanatory field, then the explanatory data field should preferably be eliminated from further consideration when at least one of the following conditions hold:
  i) the single remaining segment does not satisfy the desired statistical constraints for segments;
  or
  ii) the single remaining segment does indeed satisfy the desired statistical constraints for segments, but no segments were set aside that admit missing values for the explanatory field.
e) If all explanatory data fields were eliminated from further consideration in step 3d, then the segment selected in step 2 cannot be divided into smaller segments that satisfy the desired statistical constraints for segments. Subdivision cannot be performed; therefore, go to step 4.
f) Otherwise, for each explanatory data field that was not eliminated from consideration in step 3d, and for each segment that was constructed for the explanatory field and that was set aside in step 3c because it admits missing values, if this missing-value segment does not satisfy the desired statistical constraints for segments, then the segment model of the segment selected in step 2 should preferably be used as the segment model of the missing-value segment.
g) For each explanatory data field that was not eliminated in step 3d, evaluate the segments and associated segment models that were constructed for that data field, preferably using the desired numerical criteria for selecting splitting factors, and select the explanatory data field that preferably optimizes these criteria.
h) Remove the segment and its associated segment model that were selected in step 2 from the current plurality and replace them preferably with the segments and associated segments models that were constructed for the explanatory data field selected in step 3g. Place the segment and associated segment model that were removed in a buffer and establish linkages between the segment and associated segment model that were removed and their replacements. The segment and associated segment model that were removed are said to be the "parents" of the replacements. Similarly, the replacements are said to be the "children" of their parents.

Step 4 preferably comprises repeating steps 2 and 3 until step 2 can no long be applied.

Step 5 preferably comprises moving the segments and associated segment models in the current plurality into the buffer referred to in step 3h.

Step 6 preferably comprises evaluating the segments and associated segment models present in the buffer on a portion of the training data held aside for validation purposes, and assigning a score to each segment and associated segment model based on the evaluation, wherein lower scores indicate better models. The score should preferably correspond to the numerical criteria for selecting splitting factors. For insurance risk modeling purposes using joint Poisson/log-normal models, the score for each segment and associated segment model should preferably be given by Equation (12).

For policyholder profitability modeling purposes using joint Poisson/log-normal models, the score for each segment and associated segment model should preferably be given by Equation (55). For insurance risk or profitability modeling purposes using weighted least-squares models, the score for each segment and associated segment model should preferably be given by Equation (66).

Step 7 preferably comprises applying Quinlan's reduced error pruning method (see J. R. Quinlan, 1987, above) to the tree of segments and associated segment models present in the buffer, wherein the scores assigned in step 6 are used instead of the number of errors (i.e., misclassifications) on the test set discussed by Quinlan.

Step 8 preferably comprises moving the leaves of the pruned tree produced in step 7 from the buffer back into the current plurality.

Step 9 preferably comprises outputting a specification of the plurality of segments and associated models, preferably to a storage device readable by a machine, thereby enabling the plurality to be readily applied to generate predictions.

What is claimed is:

1. A program storage device readable by a machine, tangibly embodying a program of instructions executable by the machine to perform a method for constructing segmentation-based models that satisfy constraints on the statistical properties of the segments, the method comprising:
   (1) presenting a collection of training data records comprising examples of input values that are available to the model together with the corresponding desired output value(s) that the model is intended to predict; and
   (2) generating on the basis of the training data a plurality of segment models, that together comprise an overall model, wherein each segment model is associated with a specific segment of the training data, said generating comprising performing optimization comprising:
       a) generating alternate training data segments and associated segment models;
       b) evaluating at least one generated segment to determine whether it satisfies at least one statistical constraint; and
       c) selecting a final plurality of segment models and associated segments from among the alternates evaluated that satisfy at least one of said statistical constraints.

2. The program storage device of claim 1, wherein said evaluating at least one generated segment to determine whether it satisfies at least one statistical constraint comprises:
   performing a test whose outcome is not equivalent to a comparison between the number of training records of at least one species of training records belonging to the segment and a numerical quantity that is selectively dependent on the combination of species of training records being considered but otherwise constant for all generated segments that are evaluated.

3. The program storage device of claim 1, wherein said statistical constraint comprises at least one constraint on a statistical estimation error of the corresponding segment model.

4. The program storage device of claim 1, wherein said model relates to an insurance risk model and said at least one statistical constraint comprises an actuarial credibility constraint.

5. The program storage device of claim 4, wherein each said generated segment is evaluated using a statistical constraint based on a threshold calculated for that generated segment, said threshold based on statistical properties of claim amounts in said generated segment.

6. The program storage device of claim 1, wherein said generating alternate training data segments and associated segment models comprises splitting larger data segments into smaller data segments.

7. A program storage device readable by a machine, tangibly embodying a program of instructions executable by the machine to perform a method for constructing segmentation-based models that satisfy constraints on the statistical properties of the segments, the method comprising:
   (1) presenting a collection of training data records comprising examples of input values that are available to the model together with the corresponding output value(s) that the model is intended to predict; and
   (2) generating, on the basis of the training data, a plurality of segment models, that together comprise an overall model, wherein each segment model is associated with a specific segment of the training data, said generating comprising performing optimization comprising:
       a) generating alternate training data segments and associated segment models using statistical constraints to guide the construction of the data segments in a closed-loop fashion so as to ensure that the resulting data segments satisfy the statistical constraints; and
       b) selecting a final plurality of segment models and associated segments from among the alternates generated.

8. The program storage device of claim 7, wherein said statistical constraint comprises at least one constraint on a statistical estimation error of the corresponding segment model.

9. The program storage device of claim 7, wherein said generating a plurality of segment models comprises splitting larger data segments into smaller data segments.

10. A program storage device readable by a machine, tangibly embodying program instructions executable by the machine to perform a method for constructing segmentation-based models that satisfy constraints on the statistical properties of the segments, the method comprising:
    (1) presenting a collection of training data records comprising examples of input values that are available to the model together with the corresponding desired output value(s) that the model is intended to predict; and
    (2) generating on the basis of the training data, a plurality of segment models, that together comprise an overall model, wherein each segment model is associated with a specific segment of the training data, said generating comprising:
        a) generating alternate pluralities of data segments and associated segment models; and
        b) adjusting the alternate pluralities so that the resulting data segments satisfy the statistical constraints.

11. The program storage device of claim 10, wherein said statistical constraint comprises at least one constraint on a statistical estimation error of the corresponding segment model.

12. The program storage device of claim 10, wherein said generating alternate training data segments and associated segment models comprises splitting larger data segments into smaller data segments.

13. A program storage device readable by a machine, tangibly embodying a program of instructions executable by the machine to perform a method for constructing segmentation-based models of insurance risks, the method comprising:
- (1) presenting a collection of training data comprising examples of historical policy and claims data; and
- (2) generating on the basis of the training data a plurality of segment models, that together comprise an overall model, wherein each segment model comprises a statistical model of insurance risk that is associated with a specific segment of the training data, said generating comprising:
  - a) generating alternative pluralities of segment models in one of a top-down fashion and a bottom-up fashion;
  - b) comparing said alternative pluralities of segment models using statistical likelihood scores based on statistical models of insurance risk; and
  - c) selecting a final plurality of segment models and associated segments from among the alternates generated so as to optimize aggregate statistical likelihood scores for the plurality.

14. An apparatus comprising:
- (1) a receiver to receive a collection of training data records comprising examples of input values that are available to a model together with the corresponding desired output value(s) that the model is intended to predict; and
- (2) a calculator to generate, on the basis of the training data, a plurality of segment models, that together comprise an overall model, wherein each segment model is associated with a specific segment of the training data, wherein the generation of said plurality of segment models comprises an optimization process comprising:
  - a) generating alternate training data segments and associated segment models, each said generated segment having been evaluated to determine whether it satisfies at least one statistical constraint; and
  - b) selecting a final plurality of segment models and associated segments from among the alternates evaluated that satisfy said statistical constraints.

15. The apparatus of claim 14, wherein said model relates to an insurance risk model and said at least one statistical constraint comprises an actuarial credibility constraint.

16. A computerized method for constructing segmentation-based models that satisfy constraints on the statistical properties of the segments, the method comprising:
presenting, to a computer, a collection of training data records comprising examples of input values that are available to a model, together with the corresponding desired output value(s) that the model is intended to predict; and
based on said training data, automatically generating on said computer, a plurality of segment models, that together comprise an overall model, wherein each segment model is associated with a specific segment of the training data, said generating comprising performing optimization comprising:
generating alternate training data segments and associated segment models, each said generated alternate training data segment having been determined to satisfy at least one statistical constraint; and
selecting a final plurality of segment models and associated segments from among the alternates evaluated that satisfy said statistical constraints.

17. The computerized method of claim 16, wherein said statistical constraint comprises at least one constraint on a statistical estimation error of the corresponding segment model.

18. The computerized method of claim 16, wherein said model relates to an insurance risk model and said at least one statistical constraint comprises an actuarial credibility constraint.

19. A method of at least one of managing and providing consultation for financial decisions, said method comprising at least one of generating, transmitting, receiving, and forwarding a report executed by a computer, said computer having executed a program of instructions to perform a method for constructing segmentation-based models that satisfy constraints on the statistical properties of the segments, the method executed by said machine comprising:
- (1) presenting, to a computer, a collection of training data records comprising examples of input values that are available to a model, together with the corresponding desired output value(s) that the model is intended to predict; and
- (2) based on said training data, automatically generating, on said computer, a plurality of segment models, that together comprise an overall model, wherein each segment model is associated with a specific segment of the training data, said generating comprising performing optimization comprising:
  - a) generating alternate training data segments and associated segment models;
  - b) evaluating at least one generated segment to determine whether it satisfies at least one statistical constraint; and
  - c) selecting a final plurality of segment models and associated segments from among the alternates evaluated that satisfy said statistical constraints.

20. The method of claim 19, wherein said model relates to an insurance risk model, said at least one statistical constraint comprises an actuarial credibility constraint, and said financial decision relates to at least one of:
a price structure for insurance policies; and
a policyholder profitability.

* * * * *